(12) United States Patent
Choi et al.

(10) Patent No.: US 12,402,121 B2
(45) Date of Patent: Aug. 26, 2025

(54) METHOD AND APPARATUS OF COMMUNICATION FOR REDUCED-CAPABILITY USER EQUIPMENT IN WIRELESS COMMUNICATION SYSTEM

(71) Applicant: Samsung Electronics Co., Ltd., Suwon-si (KR)

(72) Inventors: Seunghoon Choi, Suwon-si (KR); Sungjin Park, Suwon-si (KR); Youngbum Kim, Suwon-si (KR); Hyunseok Ryu, Suwon-si (KR); Cheolkyu Shin, Suwon-si (KR); Jeongho Yeo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 490 days.

(21) Appl. No.: 17/704,550

(22) Filed: Mar. 25, 2022

(65) Prior Publication Data
US 2022/0330291 A1    Oct. 13, 2022

(30) Foreign Application Priority Data
Mar. 31, 2021   (KR) .................. 10-2021-0042243

(51) Int. Cl.
*H04W 72/1268*    (2023.01)
*H04L 5/16*    (2006.01)
(Continued)

(52) U.S. Cl.
CPC .......... *H04W 72/1268* (2013.01); *H04L 5/16* (2013.01); *H04W 56/0015* (2013.01); *H04W 74/0833* (2013.01)

(58) Field of Classification Search
CPC ......... H04W 72/1268; H04W 56/0015; H04W 74/0833; H04W 88/02; H04W 72/1263;
(Continued)

(56) References Cited

U.S. PATENT DOCUMENTS

2020/0112964 A1   4/2020   Yang et al.
2020/0112980 A1   4/2020   Ji et al.
(Continued)

FOREIGN PATENT DOCUMENTS

EP            3 678 317 A1    7/2020
KR     10-2022-0022831 A     2/2022
(Continued)

OTHER PUBLICATIONS

3GPP TS 38.211 V16.4.0, 3rd Generation Partnership Project, Technical Specification Group Radio Access Network, NR, Physical channels and modulation, (Release 16), Dec. 2020.
(Continued)

*Primary Examiner* — Ayanah S George
(74) *Attorney, Agent, or Firm* — Jefferson IP Law, LLP

(57) ABSTRACT

The disclosure relates to a 5G or 6G communication system for supporting a higher data rate beyond a 4G communication system such as long term evolution (LTE). A method performed by a user equipment (UE) in a wireless communication system according to the disclosure includes receiving reduced-capability UE configuration information from a base station, receiving information for configuring uplink transmission and downlink reception from the base station, determining whether to perform the uplink transmission and the downlink reception, based on the reduced-capability UE configuration information, and performing at least one of the uplink transmission and the downlink reception, based on the determination.

20 Claims, 18 Drawing Sheets

(51) Int. Cl.
*H04W 56/00* (2009.01)
*H04W 74/0833* (2024.01)

(58) Field of Classification Search
CPC ........ H04W 72/23; H04W 72/51; H04L 5/16; H04L 5/0053; H04L 5/0062
See application file for complete search history.

(56) References Cited

U.S. PATENT DOCUMENTS

| | | | |
|---|---|---|---|
| 2020/0196331 A1 | 6/2020 | Rico Alvarino et al. | |
| 2021/0337489 A1* | 10/2021 | Abotabl | H04L 5/14 |
| 2022/0061098 A1 | 2/2022 | Choi et al. | |
| 2022/0150928 A1 | 5/2022 | Choi et al. | |
| 2022/0322252 A1* | 10/2022 | Chen | H04L 5/0053 |
| 2022/0322390 A1* | 10/2022 | Nogami | H04W 72/0446 |

FOREIGN PATENT DOCUMENTS

| | | | | |
|---|---|---|---|---|
| WO | WO-2017173388 A1 * | 10/2017 | | H04L 27/261 |
| WO | WO-2020213877 A1 * | 10/2020 | | H04L 5/14 |
| WO | 2021/020955 A1 | 2/2021 | | |
| WO | WO-2021154058 A1 * | 8/2021 | ......... | H04L 27/2607 |

OTHER PUBLICATIONS

3GPP TS 38.213 V16.4.0, 3rd Generation Partnership Project, Technical Specification Group Radio Access Network, NR, Physical layer procedures for control, (Release 16), Dec. 2020.

International Search Report and Written Opinion dated Jun. 17, 2022, issued in International Patent Application No. PCT/KR2022/004228.

ZTE, "UE complexity reduction for reduced capability NR devices", R1-2100564, 3GPP TSG RAN WG1 #104-e, Jan. 18, 2021, XP051970453.

Moderator (Ericsson), "FL summary #2 for UE complexity reduction for RedCap", R1-2101850, 3GPP TSG-RAN WG1 Meeting #104-e, Feb. 2, 2021, XP051975940.

Xiaomi, "Discussion on the complexity reduction for Redcap", R1-2101122, 3GPP TSG RAN WG1 #104-e, Jan. 19, 2021, XP051971365.

Extended European Search Report dated Jul. 15, 2024, issued in European Patent Application No. 22781507.3.

* cited by examiner

METHOD AND APPARATUS OF COMMUNICATION FOR REDUCED-CAPABILITY USER EQUIPMENT IN WIRELESS COMMUNICATION SYSTEM

CROSS-REFERENCE TO RELATED APPLICATION(S)

This application is based on and claims priority under 35 U.S.C. § 119(a) of a Korean patent application number 10-2021-0042243, filed on Mar. 31, 2021, in the Korean Intellectual Property Office, the disclosure of which is incorporated by reference herein in its entirety.

BACKGROUND

1. Field

The disclosure relates to a method and an apparatus of communication for a reduced-capability user equipment (UE) in a wireless communication system. More particularly, the disclosure relates to a method and an apparatus of communication when up/downlink transmission/reception by a reduced-capability UE overlaps.

2. Description of Related Art

Considering the development of mobile communication from generation to generation, the technologies have been developed mainly for services targeting humans, such as voice calls, multimedia services, and data services. Following the commercialization of 5th-generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6th-generation (6G) era, there have been ongoing efforts to develop improved 6G communication systems. For these reasons, 6G communication systems are referred to as Beyond-5G systems.

6G communication systems, which are expected to be commercialized around 2030, will have a peak data rate of tera (1,000 giga)-level bps and a radio latency less than 100 μsec, and thus will be 50 times as fast as 5G communication systems and have the 1/10 radio latency thereof.

In order to accomplish such a high data rate and an ultra-low latency, it has been considered to implement 6G communication systems in a terahertz band (for example, 95 GHz to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, multiantenna transmission technologies including radio frequency (RF) elements, antennas, novel waveforms having a better coverage than OFDM, beamforming and massive MIMO, full dimensional MIMO (FD-MIMO), array antennas, and large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems: a full-duplex technology for enabling an uplink (UE transmission) and a downlink (node B transmission) to simultaneously use the same frequency resource at the same time; a network technology for utilizing satellites, high-altitude platform stations (HAPS), and the like in an integrated manner; an improved network structure for supporting mobile nodes B and the like and enabling network operation optimization and automation and the like; an use of artificial intelligence (AI) in wireless communication for improvement of overall network operation by considering AI from the initial phase of developing technologies for 6G and internalizing end-to-end AI support functions; and a next-generation distributed computing technology for overcoming the limit of UE computing ability through reachable super-high-performance communication and computing resources (MEC, clouds, and the like) over the network.

It is expected that such research and development of 6G communication systems will bring the next hyper-connected experience to every corner of life. Particularly, it is expected that services such as truly immersive extended reality (XR), high-fidelity mobile hologram, and digital replica could be provided through 6G communication systems.

In addition, to support technologies such as sensors, surveillance cameras, and smart watches, discuss on the negative resistance reduced capability (NR RedCap) terminal standard that enables data transmission and reception by accessing the 5G communication system while reducing the complexity of the terminal started in 3rd-generation partnership project (3GPP).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method performed by a reduced-capability UE and a base station when uplink transmission and downlink transmission by the reduced-capability UE overlap, and an apparatus for performing the method.

In accordance with an aspect of the present disclosure, a method performed by a terminal in a wireless communication system is provided. The method includes identifying that the terminal corresponds to a half-duplex terminal; receiving, from a base station, information on a synchronization signal block (SSB) indicating a plurality of symbols for the SSB; identifying whether a resource of an uplink transmission overlaps with an unavailable time resource including the plurality of symbols for the SSB; and in case that the resource of the uplink transmission overlaps with the unavailable time resource, skipping the uplink transmission, wherein the unavailable time resource further includes a switching time after a last symbol of the plurality of symbols for the SSB.

In accordance with another aspect of the present disclosure, a method performed by a base station in a wireless communication system is provided, the method includes identifying that a terminal corresponds to a half-duplex terminal; transmitting, to a terminal, information on a synchronization signal block (SSB) indicating a plurality of symbols for the SSB; identifying whether a resource of an uplink reception overlaps with an unavailable time resource including the plurality of symbols for the SSB; and in case that the resource of the uplink reception overlaps with the unavailable time resource, skipping to perform the uplink reception, wherein the unavailable time resource further includes a switching time after a last symbol of the plurality of symbols for the SSB.

In accordance with another aspect of the present disclosure, a base station in a wireless communication system is provided. The base station includes a transceiver and a controller coupled with the transceiver and configured to identify that the terminal corresponds to a half-duplex terminal, receive, from a base station, information on a synchronization signal block (SSB) indicating a plurality of symbols for the SSB,
  identify whether a resource of an uplink transmission overlaps with an unavailable time resource including the plurality of symbols for the SSB, and in case that the resource of the uplink transmission overlaps with the unavailable time resource, skip the uplink transmission, wherein the unavailable time resource further includes a switching time after a last symbol of the plurality of symbols for the SSB.

In accordance with another aspect of the present disclosure, a terminal for receiving data in a wireless communication system is provided. The terminal includes a transceiver and a controller coupled with the transceiver and configured to identify that a terminal corresponds to a half-duplex terminal, transmit, to a terminal, information on a synchronization signal block (SSB) indicating a plurality of symbols for the SSB, identify whether a resource of an uplink reception overlaps with an unavailable time resource including the plurality of symbols for the SSB, and in case that the resource of the uplink reception overlaps with the unavailable time resource, skip to perform the uplink reception, wherein the unavailable time resource further includes a switching time after a last symbol of the plurality of symbols for the SSB.

Additional aspects will be set forth in part in the description which follows and, in part, will be apparent from the description, or may be learned by practice of the presented embodiments.

According to an embodiment of the disclosure, efficient communication may be performed by a reduced-capability UE.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
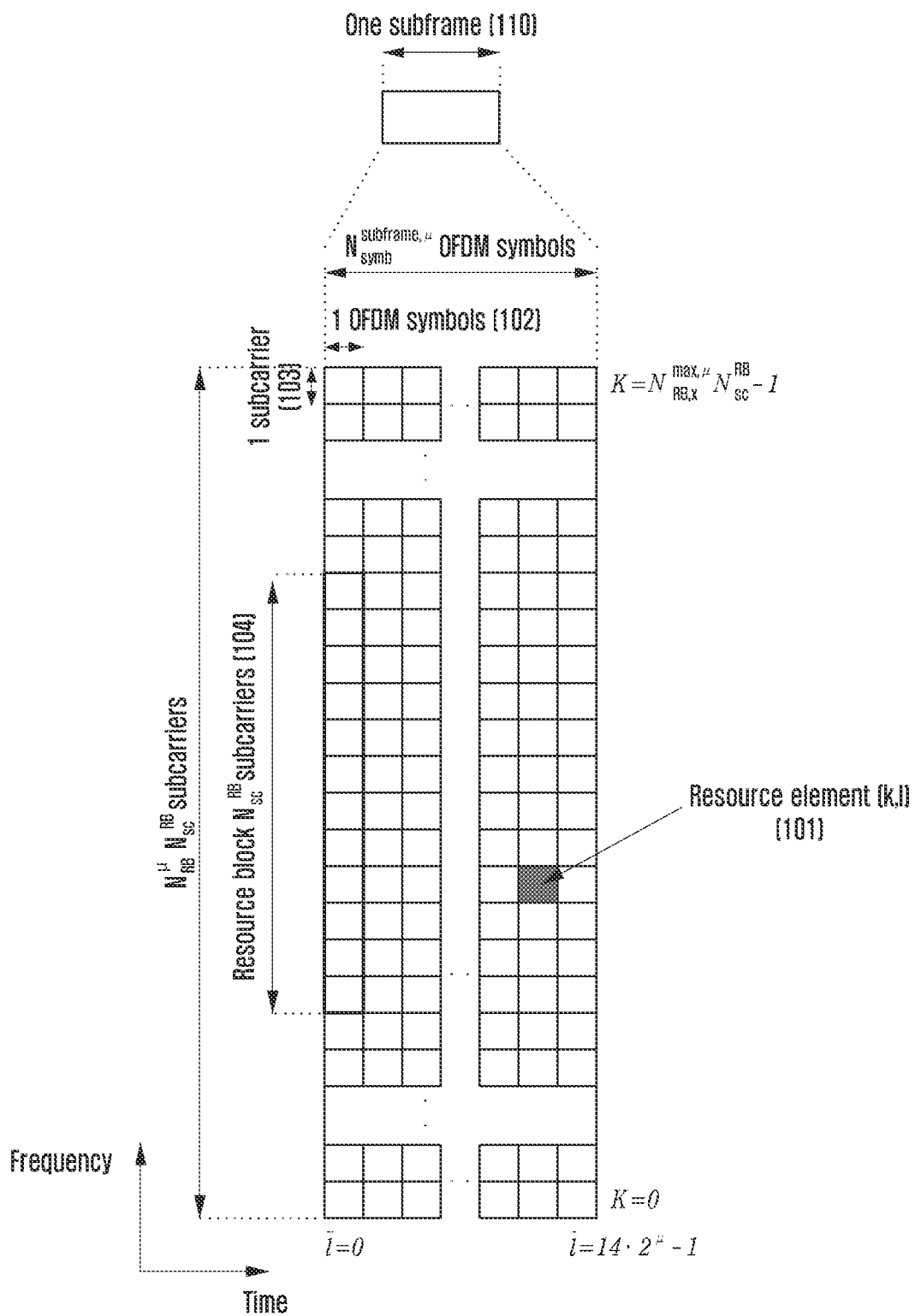
FIG. 1 illustrates a basic structure of a time-frequency domain, which is a radio resource domain, in a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. In the disclosure, a "downlink (DL)" refers to a radio link via which a base station transmits a signal to a terminal, and an "uplink (UL)" refers to a radio link via which a terminal transmits a signal to a base station. Further, in the following description, LTE or LTE-A systems may be described by way of example, but the embodiments of the disclosure may also be applied to other communication systems having similar technical backgrounds or channel types. Examples of such communication systems may include 5th generation mobile communication technologies (5G, new radio, and NR) developed beyond LTE-A, and in the following description, the "5G" may be the concept that covers the exiting LTE, LTE-A, or other similar services. In addition, based on determinations by those skilled in the art, the embodiments of the disclosure may also be applied to other communication systems through some modifications without significantly departing from the scope of the disclosure.

Herein, it will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, embodiments of the disclosure will be described in detail with reference to the accompanying drawings. The method and apparatus proposed in the embodiments of the disclosure will be described by taking an IoT service (IWSN, surveillance camera, wearable, etc.) as an example, but are not limited to each embodiment. The apparatus and method may also be applied to downlink reception and uplink transmission methods corresponding to other additional services by using all or a combination of one or more embodiments proposed in the disclosure. Accordingly, the embodiments of the disclosure are applicable through partial modifications within a range without significantly departing from the scope of the disclosure, by judgement by those skilled in technical knowledge (i.e., those skilled in the art).

Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

Beyond the early voice-oriented services, a wireless communication system has been developed as a broadband wireless communication system that provides a high-speed and high-quality packet data service, such as 3GPP high speed packet access (HSPA), long-term evolution (LTE) or evolved universal terrestrial radio access (E-UTRA), LTE-advanced (LTE-A), LTE-Pro, 3GPP2 high rate packet data (HRPD), ultra-mobile broadband (UMB), and communication standards including IEEE's 802.16e and the like.

As a representative example of the broadband wireless communication system, the LTE system has adopted an orthogonal frequency division multiplexing (OFDM) scheme in a downlink (DL) and has adopted a single carrier frequency division multiple access (SC-FDMA) scheme in an uplink (UL). The uplink refers to a radio link through which a UE transmits data or a control signal to a base station and the down link refers to a radio link through which a base station transmits data or a control signal to a UE. The multiple access scheme as described above generally allocates and operates time-frequency resources including data or control information to be transmitted to each user to prevent the time-frequency resources from overlapping with each other, that is, establish orthogonality, thereby dividing the data or the control information of each user.

A 5G communication system, which is a beyond LTE communication system, is required to freely reflect various requirements of users and service providers so that the services satisfying the various requirements should be supported at the same time. Services considered for the 5G communication system include enhanced mobile broadband (eMBB), massive machine-type communication (mMTC), ultra-reliability low latency communication (URLLC), etc.

The eMBB is aimed at providing more enhanced data rates than the LTE, LTE-A, or LTE-Pro may support. For example, in the 5G communication system, the eMBB is required to provide 20 Gbps peak data rate in a downlink and 10 Gbps peak data rate in an uplink in terms of a single BS. Furthermore, the 5G communication system may need to provide increasing user perceived data rate while providing the peak data rate. To satisfy these requirements, enhancement of various technologies for transmission or reception including multi-input multi-output (MIMO) transmission technologies may be required in the 5G communication system. While the present LTE system may use up to 20 MHz transmission bandwidth in the 2 GHz band for signal transmission, the 5G communication system may use frequency bandwidth wider than 20 MHz in the 3 to 6 GHz band or in the 6 GHz or higher band, thereby satisfying the data rate required by the 5G communication system.

At the same time, the mMTC is under consideration to support application services, such as the Internet of things (IoT), in the 5G communication system. To efficiently provide the Internet of things, the mMTC should satisfy requirements, such as massive terminal connection support in a cell, terminal coverage improvement, improved battery time, and terminal cost reduction. Since the Internet of things is attached to various sensors and various devices to provide communication functions, it should support a large number of terminals (e.g., 1,000,000 terminals/km$^2$) in the cell. Further, since the UE supporting the mMTC is highly to be located in a shaded area that the cell cannot cover, such as basement of a building, due to the service characteristics, and thus requires a wider coverage compared to other services provided by the 5G communication system. The UE supporting the mMTC should be inexpensive, and requires very long battery lifetime, such as 10 to 15 years, since it is difficult to frequently replace a battery of the UE.

Last, the URLLC is a cellular-based wireless communication service used for a specific purpose (mission-critical). For example, services may be used for remote control of a robot or machinery, industrial automation, unmanned aerial vehicle, remote health care, and emergency alert. Accordingly, the communication provided by the URLLC should provide very low latency and very high reliability. For example, a service supporting the URLLC should satisfy air interface latency that is shorter than 0.5 ms and requires a packet error rate of 10-5 or less at the same time. Accordingly, for the service supporting the URLLC, the 5G system should provide a transmit time interval (TTI) that is smaller than those of other services, and also requires a design to allocate wide resources in the frequency band in order to secure reliability of a communication link.

The three services of the 5G communication system (hereinafter, interchangeable with the 5G system), i.e., eMBB, URLLC, and mMTC, may be multiplexed and transmitted in one system. At this time, different transmission/reception techniques and transmission/reception parameters may be used to satisfy different requirements of the respective services.

Hereinafter, a frame structure of the 5G system will be described in more detail with reference to the drawings. Hereinafter, a wireless communication system to which the disclosure is applied will be described by taking the configuration of a 5G system as an example for convenience of description, but embodiments of the disclosure may be applied in the same or similar manner even in 5G or higher systems or other communication systems to which the disclosure is applicable.

FIG. 1 illustrates a basic structure of a time-frequency domain, which is a radio resource domain, in a wireless communication system according to an embodiment of the disclosure.

Referring to FIG. 1, the horizontal axis represents a time domain, and the vertical axis represents a frequency domain. A basic unit of a resource in the time and frequency domain, which is a resource element (RE) 101, may be defined as one orthogonal frequency division multiplexing (OFDM) symbol (or discrete Fourier transform spread OFDM (DFT-s-OFDM) symbol) 102 in the time axis and one subcarrier 103 in the frequency axis. $N_{sc}^{RB}$ consecutive REs (for example, 12) indicating the number of subcarriers per resource block (RB) in the frequency domain may constitute one resource block (RB) 104. In addition, $N_{slot}^{subframe}$ consecutive OFDM symbols indicating the number of symbols per subframe in the time domain may constitute one subframe 110. For a more detailed description of the resource structure in the 5G system, reference may be made to the TS 38.211 section 4 standard.

Figure 2:
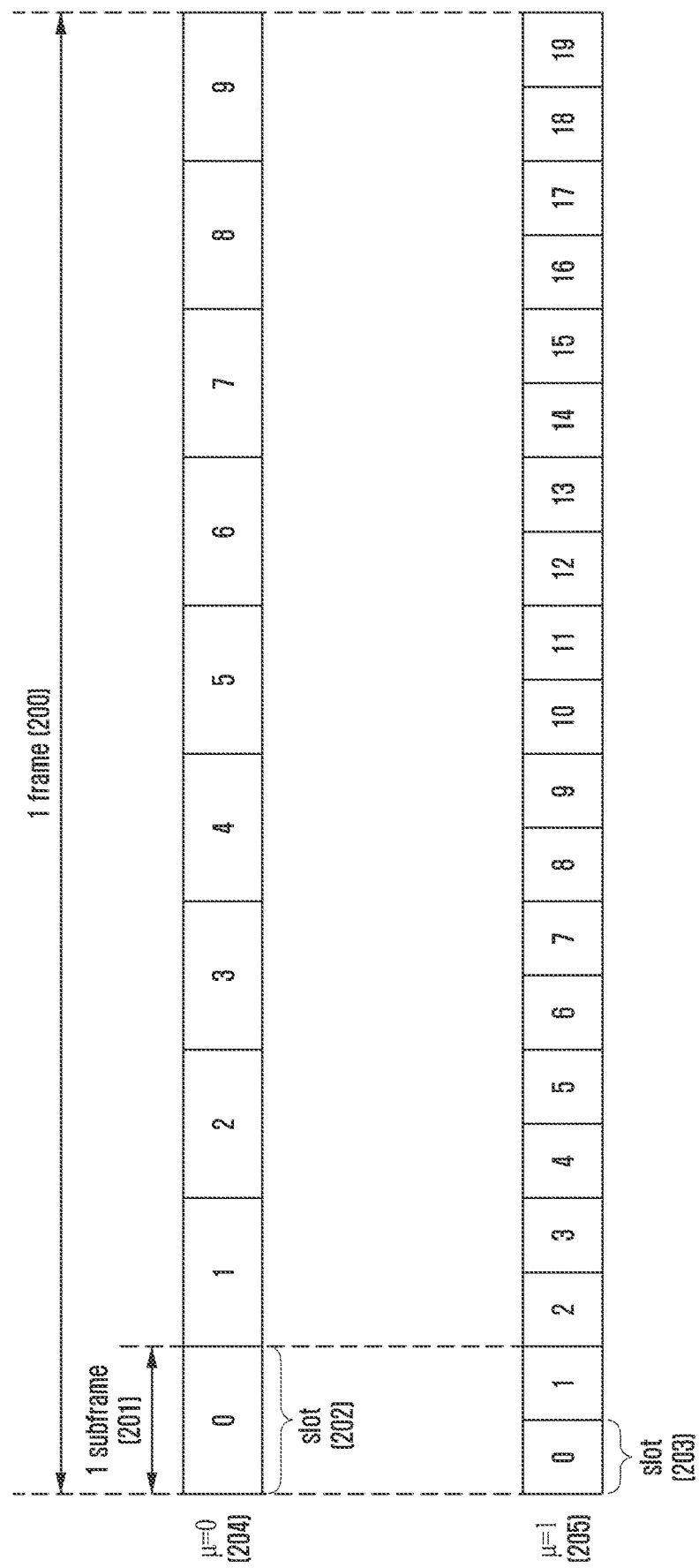
FIG. 2 illustrates a slot structure considered in a wireless communication system according to an embodiment of the disclosure.

FIG. 2 illustrates a slot structure considered in a wireless communication system according to an embodiment of the disclosure.

Referring to FIG. 2, it illustrates an example of a structure including a frame 200, a subframe 201, and a slot 202. One frame 200 may be defined as 10 ms. One subframe 201 may be defined as 1 ms, and thus, one frame 200 may include a total of 10 subframes 201. In addition, one slot 202 and 203 may be defined as 14 OFDM symbols (i.e., the number of symbols ($N_{symb}^{slot}$) per one slot=14). One subframe 201 may include one or multiple slots 202 and 203, and the number of slots 202 and 203 per one subframe 201 may vary according to a configured value, μ 204 and 205 for a subcarrier spacing.

As an example, FIG. 2 illustrates a slot structure in a case of μ=0 204 and μ=1 205 for the subcarrier spacing configuring value. In case that μ=0 204, one subframe 201 may include one slot 202, and in case that μ=1 205, one subframe 201 may include two slots 203. That is, the number of slots ($N_{slot}^{subframe,\mu}$) per one subframe may vary according to the configured value μ for a subcarrier spacing, and accordingly, the number of slots ($N_{slot}^{frame,\mu}$) per one frame may vary. The $N_{slot}^{frame,\mu}$ and the $N_{slot}^{frame,\mu}$ according to each subcarrier spacing configuring p may be defined in Table 1 below.

TABLE 1

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In the 5G wireless communication system, a synchronization signal block (which may be interchangeable with an SSB, an SS block, an SS/PBCH block, etc.) may be transmitted for initial access of a UE, and the synchronization signal block may include a primary synchronization signal (PSS), a secondary synchronization signal (SSS), and a physical broadcast channel (PBCH). In the initial access phase in which the UE accesses the system, the UE first acquires downlink time and frequency domain synchronization from a synchronization signal through cell search and acquires a cell ID. The synchronization signal includes PSS and SSS. In addition, the UE receives the PBCH for transmitting a master information block (MIB) from the base station, and acquires system information related to transmission and reception, such as system bandwidth or relevant control information, and a basic parameter value. Based on this information, the UE may perform decoding on a physical downlink control channel (PDCCH) and a physical downlink shared channel (PDSCH) to acquire a system information block (SIB). Thereafter, the UE exchanges UE-related identification information with the base station through a random access procedure, and initially accesses the network through procedures such as registration and authentication.

Hereinafter, the cell initial access procedure of the 5G wireless communication system will be described in more detail with reference to the drawings.

The synchronization signal, which is a reference signal of the cell search, is transmitted by applying a subcarrier spacing suitable for a channel environment such as phase noise to each frequency band. The 5G base station may transmit a plurality of synchronization signal blocks according to the number of analog beams to be operated. For example, PSS and SSS may be mapped over 12 RBs and then transmitted, and PBCH may be mapped over 24 RBs and then transmitted. Hereinafter, a structure in which a synchronization signal and a PBCH are transmitted in a 5G communication system will be described.

Figure 3:
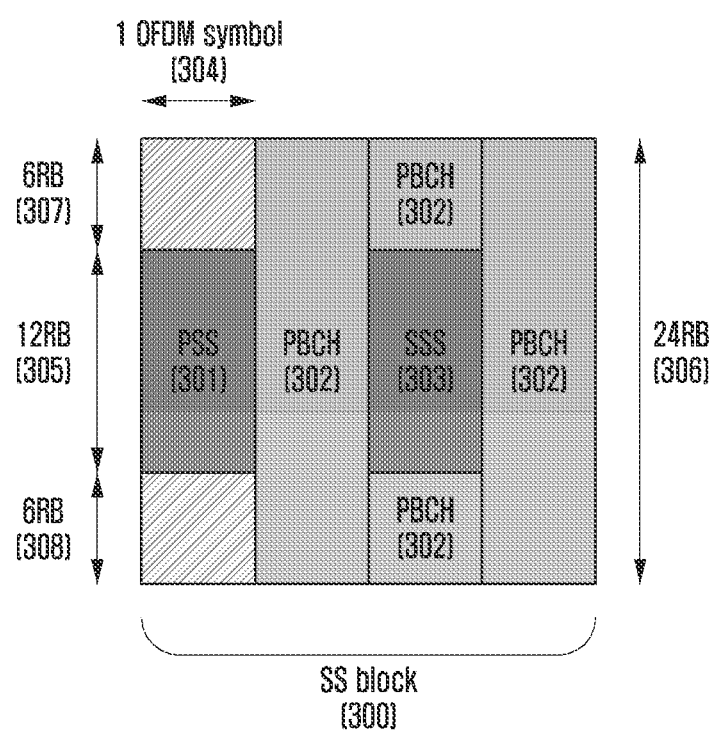
FIG. 3 illustrates a synchronization signal block considered in a wireless communication system according to an embodiment of the disclosure.

FIG. 3 illustrates a synchronization signal block considered in a wireless communication system according to an embodiment of the disclosure.

According to FIG. 3, a synchronization signal block (SS block) 300 includes a PSS 301, an SSS 303, and a PBCH 302.

Referring to FIG. 3, the SS block 300 is mapped to four OFDM symbols 304 in the time axis. The PSS 301 and the SSS 303 may be transmitted through 12 RBs 305 in the frequency axis and through the 1st and 3rd OFDM symbols in the time axis, respectively. In the 5G system, for example, a total of 1008 different cell IDs may be defined, and the PSS 301 may have three different values and the SSS 303 may have 336 different values according to the physical layer ID of a cell. The UE may acquire one of (336×3=)1008 cell IDs, based on a combination of the PSS 301 and the SSS 303 through detection thereof. This may be expressed as Equation 1 below.

$$N_{ID}^{cell} = 3N_{ID}^{(1)} + N_{ID}^{(2)} \qquad \text{Equation 1}$$

$N^{(1)}_{ID}$ may be estimated from the SSS 303 and may have a value between 0 and 335. $N^{(2)}_{ID}$ may be estimated from PSS 301 and may have a value between 0 and 2. $Nc^{ellID}$ value, a cell ID, may be estimated by the UE from a combination of $N^{(1)}_{ID}$ and $N^{(2)}_{ID}$.

The PBCH 302 may be transmitted through resources including 24 RBs 306 in the frequency axis and 6 RBs 307 and 308 at both sides except for the central 12 RBs in which the SSS 303 is transmitted in the 2nd to 4th OFDM symbols of the SS block in the time axis. Various system information called MIB may be transmitted in the PBCH 302, and more specifically, the MIB may include information as shown in Table 2 below, and a PBCH payload and a PBCH demodulation reference signal (DMRS) include the following additional information. For a more detailed description of the MIB in the 5G system, reference may be made to the TS 38.331 standard.

TABLE 2

| MIB ::= | SEQUENCE { |
|---|---|
| systemFrameNumber | BIT STRING (SIZE (6)), |
| subCarrierSpacingCommon | ENUMERATED {scs15or60, scs30or120}, |
| ssb-SubcarrierOffset | INTEGER (0..15), |
| dmrs-TypeA-Position | ENUMERATED {pos2, pos3}, |

TABLE 2-continued

```
pdcch-ConfigSIB1        PDCCH-ConfigSIB1,
cellBarred              ENUMERATED {barred, notBarred},
intraFreqReselection      ENUMERATED {allowed, notAllowed},
spare                   BIT STRING (SIZE (1))
}
```

Synchronization signal block information: The offset in the frequency domain of the synchronization signal block is indicated through 4 bits (ssb-SubcarrierOffset) in the MIB. The index of the synchronization signal block including the PBCH may be indirectly acquired through decoding of the PBCH DMRS and PBCH. More specifically, in the frequency band of 6 GHz or less, 3 bits acquired through decoding of the PBCH DMRS may indicate the synchronization signal block index, and in the frequency band of 6 GHz or higher, a total of 6 bits including 3 bits acquired through decoding of the PBCH DMRS and 3 bits included in PBCH payload and acquired through PBCH decoding may indicate the synchronization signal block index including PBCH.

Physical downlink control channel (PDCCH) information: A subcarrier spacing of a common downlink control channel is indicated through 1 bit (subCarrierSpacingCommon) in the MIB, and time-frequency resource configuration information of CORESET (control resource set) and a search space (SS) is indicated through 8 bits (pdcch-ConfigSIB1).

System frame number (SFN): 6 bits (systemFrameNumber) in the MIB are used to indicate a part of the SFN. The Least Significant Bit (LSB) 4 bits of the SFN are included in the PBCH payload to be indirectly acquired by a UE through PBCH decoding.

Timing information in a radio frame: The UE may indirectly confirm whether the synchronization signal block is transmitted in the 1st or 2nd half frame of the radio frame through 1 bit (half frame) included in the above-described synchronization signal block index and PBCH payload and acquired through PBCH decoding.

12 RBs 305 corresponding to a transmission bandwidth of the PSS 301 and the SSS 303 and 24 RBs 306 corresponding to a transmission bandwidth of the PBCH 302 are different from each other such that in an 1st OFDM symbol in which the PSS 301 is transmitted within the transmission bandwidth of the PBCH 302, 6 RBs 307 and 6 RBs 308 exist at both sides except for the central 12 RBs in which the PSS 301 is transmitted, and the 6 RBs 307 and the 6 RBs 308 may be used for transmission of another signal or may be empty.

All synchronization signal blocks may be transmitted using the same analog beam. That is, the PSS 301, the SSS 303, and the PBCH 302 may all be transmitted through the same beam. The analog beam is not applicable differently in the frequency axis such that the same analog beam is applied in any frequency axis RB in a particular OFDM symbol to which a particular analog beam is applied. That is, four OFDM symbols in which the PSS 301, the SSS 303, and the PBCH 302 are transmitted may be transmitted through the same analog beam.

Figure 4:
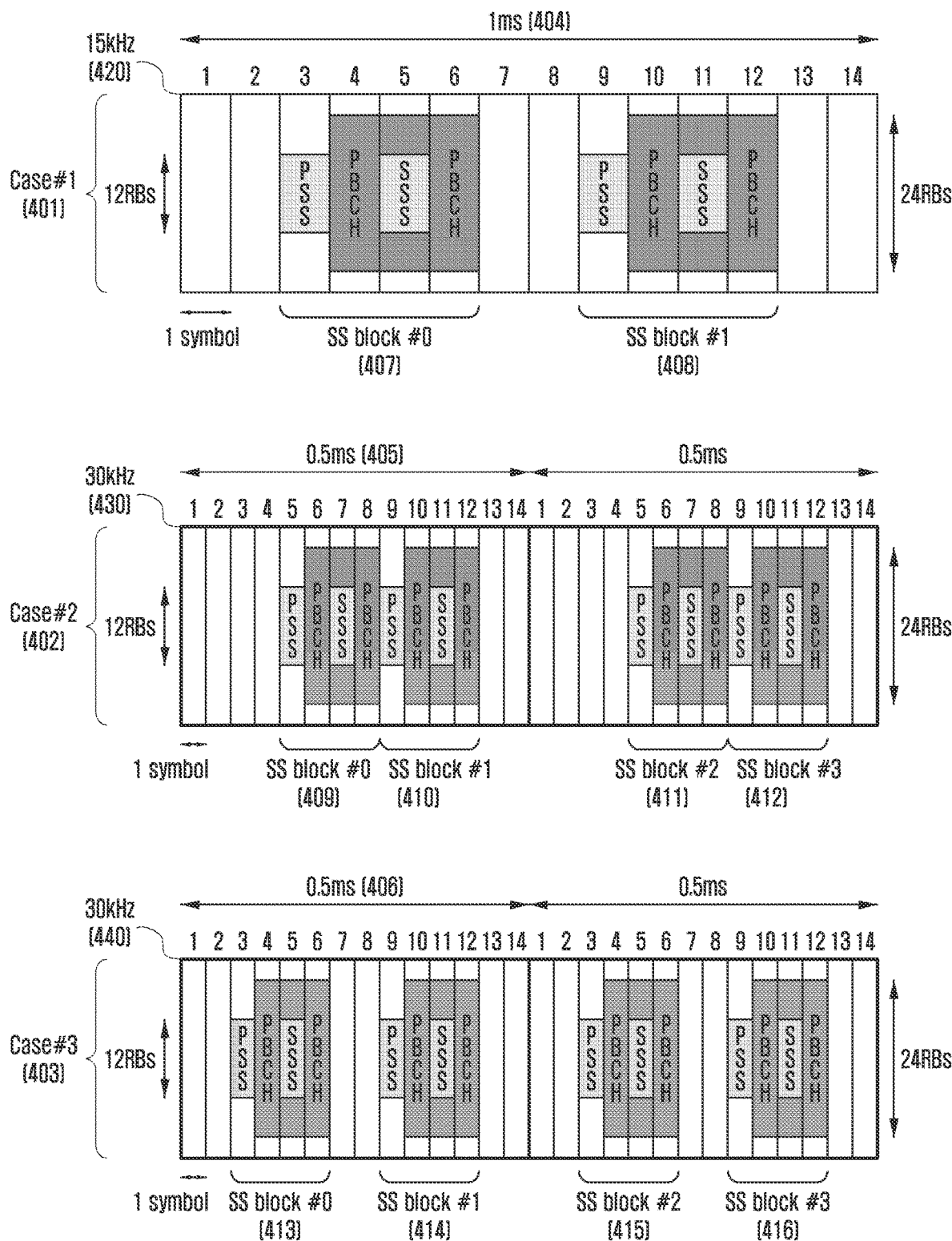
FIG. 4 illustrates cases in which a synchronization signal block considered in a wireless communication system applied is transmitted in a frequency band of 6 GHz or less according to an embodiment of the disclosure.

FIG. 4 illustrates cases in which a synchronization signal block considered in a wireless communication system applied is transmitted in a frequency band of 6 GHz or less according to an embodiment of the disclosure.

In the 5G communication system, a 15 kHz subcarrier spacing (SCS) 420 and 30 kHz subcarrier spacings 430 and 440 may be used for synchronization signal block transmission in the frequency band of 6 GHz or less. In case of the 15 kHz subcarrier spacing, one transmission case (case #1 401) of the synchronization signal block may exist, and in case of the 30 kHz subcarrier spacings, two transmission cases (case #2 402 and case #3 403) of the synchronization signal block may exist.

Referring to FIG. 4, in case #1 401 of the 15 kHz subcarrier spacing 420, a maximum of two synchronization signal blocks may be transmitted within 1 ms 404 (or corresponding to a length of one slot in case that one slot includes 14 OFDM symbols). The example of FIG. 4 shows a case in which a synchronization signal block #0 407 and a synchronization signal block #1 408. For example, the synchronization signal block #0 407 may be mapped to four consecutive symbols starting from a 3rd OFDM symbol, and the synchronization signal block #1 408 may be mapped to four consecutive symbols starting from a 9th OFDM symbol.

Different analog beams may be applied to the synchronization signal block #0 407 and the synchronization signal block #1 408. In addition, the same beam may be applied to 3rd to 6th OFDM symbols to which synchronization signal block #0 407 is mapped, and the same beam may be applied to 9th to 12th OFDM symbols to which synchronization signal block #1 408 is mapped. Analog beam to be used for the 7th, 8th, 13th, and 14th OFDM symbols to which no synchronization signal block is mapped may be freely determined under the determination of a base station.

Referring to FIG. 4, in case #2 402 of the 30 kHz subcarrier spacing 430, a maximum of two synchronization signal blocks may be transmitted within 0.5 ms 405 (or corresponding to a length of one slot in case that one slot includes 14 OFDM symbols), and accordingly, a maximum of four synchronization signal blocks may be transmitted within 1 ms (or corresponding a length of two slots in case that one slot includes 14 OFDM symbols). As an example, FIG. 4 shows a case in which the synchronization signal block #0 409, the synchronization signal block #1 410, the synchronization signal block #2 411, and the synchronization signal block #3 412 are transmitted within 1 ms (i.e., two slots). At this time, the synchronization signal block #0 409 and the synchronization signal block #1 410 may be mapped from a 5th OFDM symbol and a 9th OFDM symbol of a 1st slot, respectively, and the synchronization signal block #2 411 and synchronization signal block #3 412 may be mapped from a 3rd OFDM symbol and a 7th OFDM symbol of a 2nd slot, respectively.

Different analog beams may be applied to the synchronization signal block #0 409, the synchronization signal block #1 410, the synchronization signal block #2 411, and the synchronization signal block #3 412. The same analog beam may be applied to the 5th to the 8th OFDM symbols of the 1st slot through which synchronization signal block #0 409 is transmitted, the nineth to the 12th OFDM symbols of the 1st slot through which the synchronization signal block #1

410 is transmitted, the 3rd to the 6th symbols of the 2nd slot through which the synchronization signal block #2 411 is transmitted, the 7th to the 10 symbols of the 2nd slot through which synchronization signal block #3 412 is transmitted. Analog beam to be used for the OFDM symbols to which no synchronization signal block is mapped may be freely determined under the determination of a base station.

Referring to FIG. 4, in case #3 403 of the 30 kHz subcarrier spacing 440, a maximum of two synchronization signal blocks may be transmitted within 0.5 ms 406 (or corresponding to a length of one slot in case that one slot includes 14 OFDM symbols), and accordingly, a maximum of four synchronization signal blocks may be transmitted within 1 ms (or corresponding to a length of two slots in case that one slot includes 14 OFDM symbols). As an example, FIG. 4 shows a case in which the synchronization signal block #0 413, the synchronization signal block #1 414, the synchronization signal block #2 415, and the synchronization signal block #3 416 are transmitted within 1 ms (i.e., two slots). At this time, the synchronization signal block #0 413 and the synchronization signal block #1 414 may be mapped from the 3rd OFDM symbol and the 9th OFDM symbol of the 1st slot, respectively, and the synchronization signal block #2 415 and the synchronization signal block #3 416 may be mapped from the 3rd OFDM symbol and the 9th OFDM symbol of the 2nd slot, respectively.

Different analog beams may be used for the synchronization signal block #0 413, the synchronization signal block #1 414, the synchronization signal block #2 415, and the synchronization signal block #3 416. As described in the above examples, the same analog beam may be used in all four OFDM symbols through which the respective synchronization signal blocks are transmitted, and analog beam to be used for the OFDM symbols to which no synchronization signal block is mapped may be freely determined under the determination of a base station.

Figure 5:
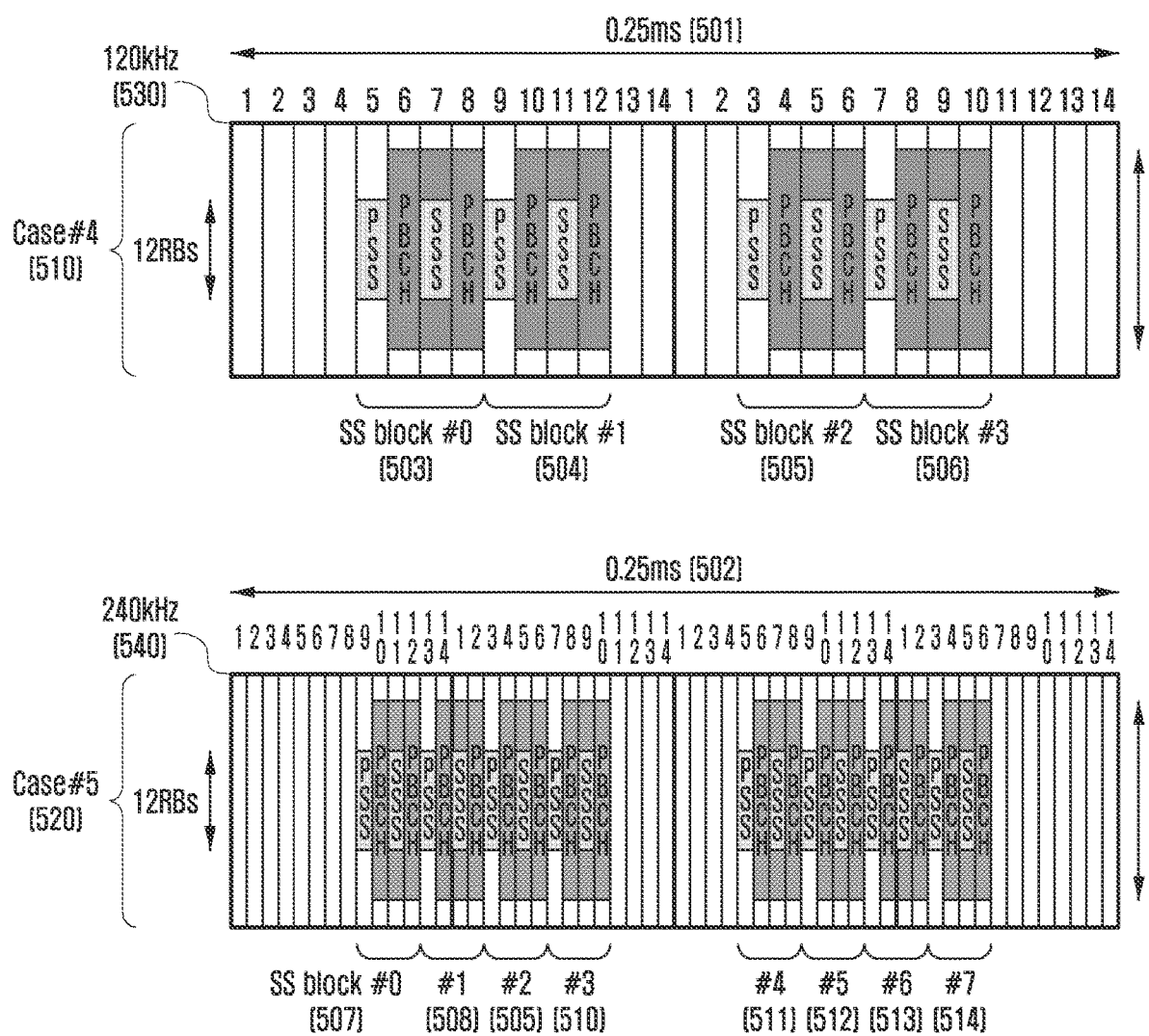
FIG. 5 illustrates cases in which a synchronization signal block considered in a wireless communication system applied is transmitted in a frequency band of 6 GHz or higher according to an embodiment of the disclosure.

FIG. 5 illustrates cases in which a synchronization signal block considered in a wireless communication system applied is transmitted in a frequency band of 6 GHz or higher according to an embodiment of the disclosure.

In the frequency band of 6 GHz or higher in the 5G communication system, 120 kHz subcarrier spacing 530 as in the example of case #4 510 may be used synchronization signal block transmission and 240 kHz subcarrier spacing 540 as in the example of case #5 520 may be used for synchronization signal block transmission.

In case #4 510 of 120 kHz subcarrier spacing 530, a maximum of four synchronization signal blocks may be transmitted within 0.25 ms 501 (or corresponding to a length of two slots in case that one slot includes 14 OFDM symbols).

Referring to FIG. 5, it shows a case in which the synchronization signal block #0 503, the synchronization signal block #1 504, the synchronization signal block #2 505, and the synchronization signal block #3 506 are transmitted within 0.25 ms (i.e., two slots). At this time, the synchronization signal block #0 503 may be mapped to four consecutive symbols starting from the 5th OFDM symbol of the 1st slot and the synchronization signal block #1 504 may be mapped to four consecutive symbols starting from the 9th OFDM symbol of the 1st slot. In addition, the synchronization signal block #2 505 may be mapped to four consecutive symbols starting from the 3rd OFDM symbol of the 2nd slot and the synchronization signal block #3 506 may be mapped to four consecutive symbols starting from the 7th OFDM symbol of the 2nd slot.

As described in the above embodiment, different analog beams may be used in the synchronization signal block #0 503, the synchronization signal block #1 504, the synchronization signal block #2 505, and the synchronization signal block #3 506. In addition, the same analog beam may be used in all four OFDM symbols through which the respective synchronization signal blocks are transmitted, and analog beam to be used in the OFDM symbols to which no synchronization signal block is mapped may be freely determined under the determination of a base station.

In case #5 520 of 240 kHz subcarrier spacing 540, a maximum of eight synchronization signal blocks may be transmitted within 0.25 ms 502 (or corresponding to a length of four slots in case that one slot includes 14 OFDM symbols). The example of FIG. 5 shows a case in which the synchronization signal block #0 507, the synchronization signal block #1 508, the synchronization signal block #2 509, the synchronization signal block #3 510, the synchronization signal block #4 511, the synchronization signal block #5 512, the synchronization signal block #6 513, and the synchronization signal block #7 514 are transmitted within 0.25 ms (i.e., four slots). At this time, the synchronization signal block #0 507 may be mapped to four consecutive symbols starting from the 9th OFDM symbol of the 1st slot, the synchronization signal block #1 508 may be mapped to four consecutive symbols starting from the 13th OFDM symbol of the 2nd slot, the synchronization signal block #2 509 may be mapped to four consecutive symbols starting from the 3rd OFDM symbol of the 2nd slot, the synchronization signal block #3 510 may be mapped to four consecutive symbols starting from the 7th OFDM symbol of the 2nd slot, the synchronization signal block #4 511 may be mapped to four consecutive symbols starting from the 5th OFDM symbol of the 3rd slot, the synchronization signal block #5 512 may be mapped to four consecutive symbols starting from the 9th OFDM symbol of the 3rd slot, the synchronization signal block #6 513 may be mapped to four consecutive symbols starting from the 13th OFDM symbol of the 3rd slot, and the synchronization signal block #7 514 may be mapped to four consecutive symbols from the 3rd OFDM symbol of the 4th slot.

As described in the above embodiment, different analog beams may be used for the synchronization signal block #0 507, the synchronization signal block #1 508, the synchronization signal block #2 509, the synchronization signal block #3 510, the synchronization signal block #4 511, the synchronization signal block #5 512, the synchronization signal block #6 513, and the synchronization signal block #7 514. In addition, the same analog beam may be used in all four OFDM symbols through which the respective synchronization signal blocks are transmitted, and analog beam to be used in the OFDM symbols to which no synchronization signal block is mapped may be freely determined under the determination of a base station.

Figure 6:
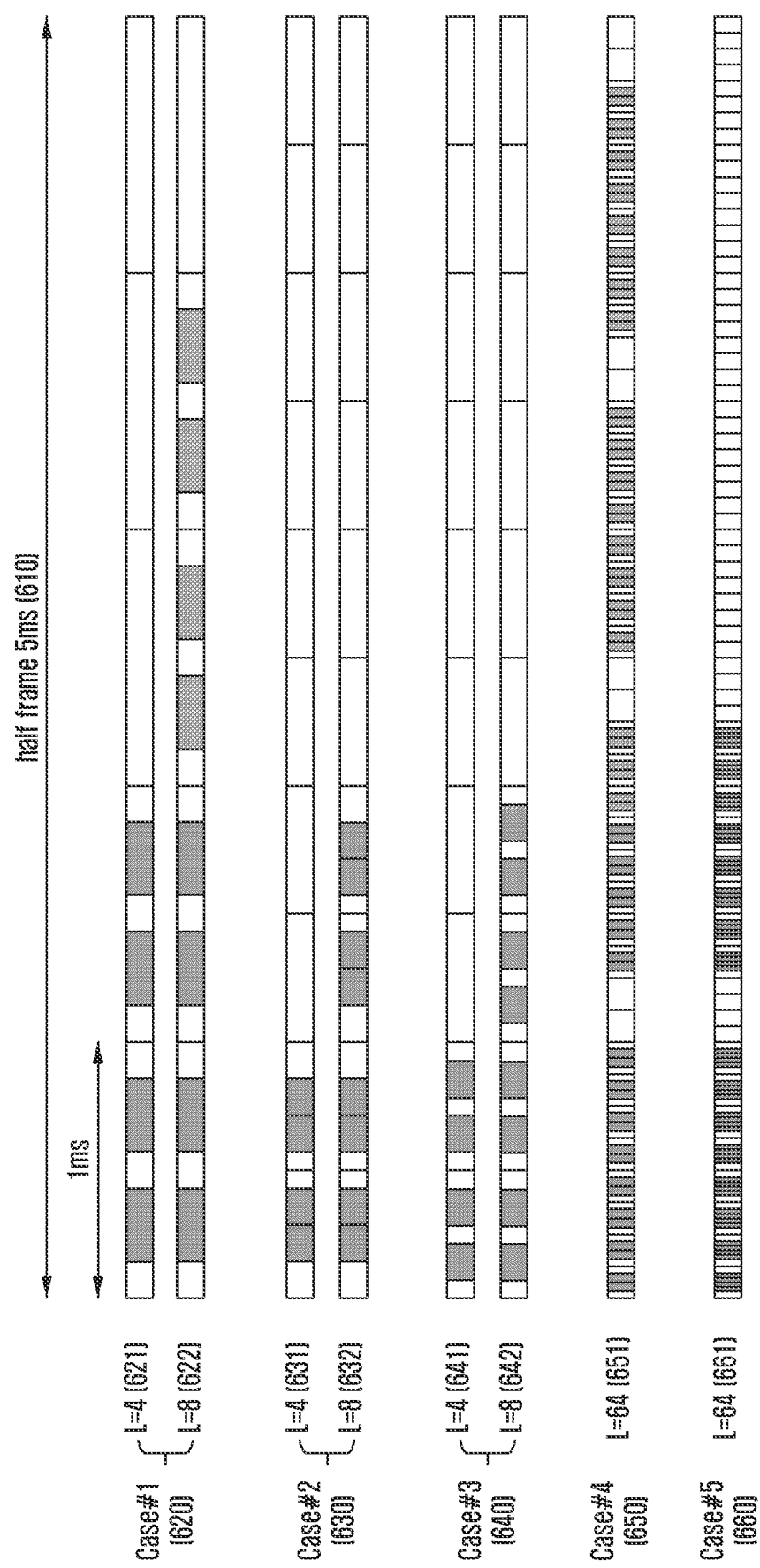
FIG. 6 illustrates cases in which a synchronization signal block according to a subcarrier spacing is transmitted within 5 ms in a wireless communication system according to an embodiment of the disclosure.

FIG. 6 illustrates cases in which a synchronization signal block according to a subcarrier spacing is transmitted within 5 ms in a wireless communication system according to an embodiment of the disclosure. In the 5G communication system, a synchronization signal block may be periodically transmitted in units of 5 ms (corresponding to five subframes or half frame 610).

In a frequency band of 3 GHz or less, a maximum of four synchronization signal blocks may be transmitted within 5 ms 610. A maximum of eight synchronization signal blocks may be transmitted in a frequency band higher than 3 GHz and less than or equal to 6 GHz. A maximum of sixty four synchronization signal blocks may be transmitted in the frequency band of higher than 6 GHz. As described above, the 15 kHz subcarrier spacing and the 30 kHz subcarrier spacing may be used at frequencies of 6 GHz or higher.

Referring to FIG. 6, in case #1 401 (i.e., 620) of the 15 kHz subcarrier spacing configured by one slot of FIG. 4, mapping may be performed on the 1st slot and the 2nd slot in a frequency band of 3 GHz or less, and accordingly, a maximum of four synchronization signal blocks 621 may be transmitted. In addition, mapping may be performed on the 1st, 2nd, 3rd, and 4th slots in a frequency band greater than 3 GHz and less than or equal to 6 GHz, and accordingly, a maximum of eight synchronization signal blocks 622 may be transmitted. In case #2 402 (i.e., 630) or case #3 403 (i.e., 640) of the 30 kHz subcarrier spacing configured by two slots of FIG. 4, mapping may be performed starting from the 1st slot in a frequency band of 3 GHz or less, and accordingly, a maximum of four synchronization signal blocks 631 and 641 may be transmitted. In addition, mapping may be performed starting from the 1st and 3rd slots in a frequency band greater than 3 GHz and less than or equal to 6 GHz, and accordingly, a maximum of eight synchronization signal blocks 632 and 642 may be transmitted.

The 120 kHz subcarrier spacing and the 240 kHz subcarrier spacing may be used at frequencies higher than 6 GHz.

Referring to FIG. 6, in case #4 510 (i.e., 650) of the 120 kHz subcarrier spacing configured by two slots of FIG. 5, mapping may be performed starting from the 1st, 3rd, 5th, 7th, 11th, 13th, 15th, 17th, 21st, 23rd, 25th, 31st, 33rd, 35th, and 37th slots in a frequency band higher than 6 GHz, and accordingly, a maximum of sixty four synchronization signal blocks 651 may be transmitted.

Referring to FIG. 6, in case #5 520 (i.e., 660) of the 240 kHz subcarrier spacing configured by four slots of FIG. 5, mapping may be performed starting from the 1st, 5th, 9th, 13th, 21st, 25th, 29th, and 33rd slots in a frequency band higher than 6 GHz, and accordingly, a maximum of sixty four synchronization signal blocks 661 may be transmitted.

A UE may decode a PDCCH and a PDSCH, based on system information included in a received MIB and acquire an SIB. The SIB may include at least an uplink cell bandwidth, a random access parameter, a paging parameter, a parameter related to uplink power control, etc.

Meanwhile, in 3GPP, discussion on a reduced-capability UE operating based on NR is in progress. In the disclosure, the reduced-capability UE may acquire cell synchronization by receiving a synchronization signal block in the initial cell access for accessing a cell (or a base station) as shown in the embodiment of FIG. 4 or 5 and then determine whether the cell supports a reduced-capability UE through MIB acquisition or SIB acquisition or a random access process. In case that the cell is determined to support a reduced-capability UE, the reduced-capability UE may transmit capability information on a bandwidth size supported in the cell by the reduced-capability UE, whether full-duplex communication or half-duplex communication is supported, and the number of transmitting or receiving antennas being performed (or supported) to the base station to enable the base station to know that the UE attempting to access is a reduced-capability UE. Alternatively, in case that half-duplex communication support is essential for the reduced-capability UE, information on whether half-duplex communication is supported may be omitted from the capability information.

The base station may configure separate random access resources for each of a reduced-capability UE or a reduced-capability UE supporting duplex communication and a reduced-capability UE supporting half-duplex communication, and transmit configuration information on the random access resource to the reduced-capability UE through system information. The system information for transmitting information on the random access resource may be system information transmitted separately from system information for a UE supporting a different standard within a cell, and the base station may configure separate random access resources for the UE supporting a different standard and the reduced-capability UE, thereby distinguishing whether the UE supporting a different standard performs random access or the reduced-capability UE performs random access. Alternatively, the base station may configure a common random access resource for all UEs in a cell without configuring a separate random access resource for a reduced-capability UE. The configuration information for the random access resource may be transmitted to all UEs in the cell through system information, and the UE having received the system information may perform random access at the random access resource.

Thereafter, the UE may complete the random access process to proceed to the RRC connection mode for performing transmission and reception of data with the cell.

In general, a UE may form a radio link with a network through a random access procedure, based on system information and synchronization with the network obtained in the cell search process of the cell. A contention-based or contention-free scheme may be used for random access. In case that the UE performs cell selection and reselection in an initial access phase of the cell, for example, contention-based random access scheme may be used for the purpose of state transition from the RRC_IDLE (RRC idle) state to the RRC_CONNECTED (RRC connection) state. Contention-free random access may be used in the case of arrival of downlink data, in the case of handover, or in the case of re-establishing uplink synchronization in the case of location measurement.

Table 3 below exemplifies the conditions (events) under which the random access procedure is triggered in the 5G system. For a detailed description, reference may be made to TS 38.300.

TABLE 3

Initial access from RRC_IDLE;
RRC Connection Re-establishment procedure;
DL or UL data arrival during RRC_CONNECTED when UL synchronisation status is "non-synchronised";
UL data arrival during RRC_CONNECTED when there are no PUCCH resources for SR available;
SR failure;
Request by RRC upon synchronous reconfiguration (e.g. handover);
Transition from RRC_INACTIVE;
To establish time alignment for a secondary TAG;
Request for Other SI;
Beam failure recovery.

Figure 7:
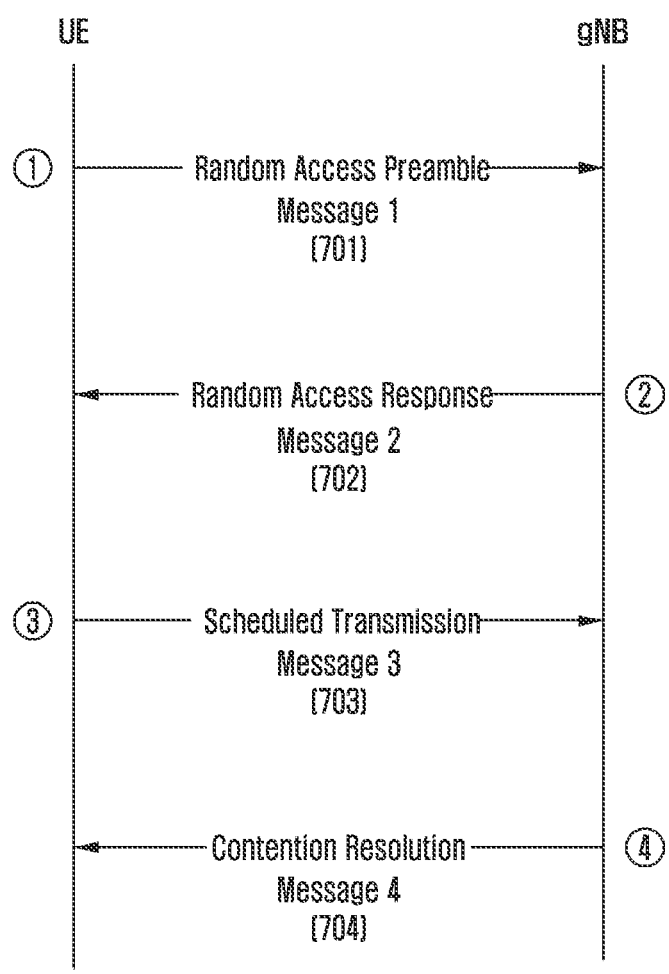
FIG. 7 illustrates a four-step random access procedure in a wireless communication system according to an embodiment of the disclosure.

FIG. 7 illustrates a random access procedure in a wireless communication system to which the disclosure is applied. This shows a contention-based random access procedure according to an embodiment of the disclosure.

Referring to FIG. 7, although not shown, the base station transmits a synchronization signal block as described in the above embodiments. The base station may periodically transmit the synchronization signal block using beam sweeping. For example, the base station may transmit synchronization signal blocks including PSS/SSS (synchronization signal) and PBCH (broadcast channel) signals by using up to 64 different beams for 5 ms, and the multiple synchronization signal blocks may be transmitted using different beams. The UE detects (selects) a synchronization signal block having an optimal beam direction (e.g., a beam direction having the strongest received signal strength or greater than a predetermined threshold) and transmits a preamble using physical random access channel (PRACH) resource related to the detected synchronization signal block. That is, as a first operation 701 of the random access procedure, the UE transmits a random access preamble (or message 1) to the base station. Then, the base station measures the transmission delay value between the UE and the base station and performs uplink synchronization.

Specifically, the UE transmits a random access preamble randomly selected within the random access preamble set given by system information in advance. In addition, the initial transmission power of the random access preamble is determined according to the pathloss between the base station and the UE measured by the UE. Further, the UE may determine the transmission beam direction (or transmission beam or beam) of the random access preamble, based on the synchronization signal block received from the base station and transmit the random access preamble by applying the determined transmission beam direction.

In a second operation 702, the base station transmits a random access response (RAR, or message 2) to the detected random access attempt to the UE. The base station transmits an uplink transmission timing control command to the UE by using the transmission delay value measured from the random access preamble received in the first operation. In addition, the base station transmits a power control command and an uplink resource to be used by the UE, as scheduling information. The scheduling information may include control information for an uplink transmission beam of the UE. The RAR is transmitted through the PDSCH and may include at least one of the following information.

Random access preamble sequence index detected by a network (or base station)
TC-RNTI (temporary cell radio network temporary identifier)
Uplink scheduling grant
Timing advance value In case that the UE does not receive the RAR, which is scheduling information for message 3, from the base station for a predetermined time in the second operation 702, the UE proceeds to the first operation 701 again. In case that the first operation is performed again, the UE increases the transmission power of the random access preamble by a predetermined step and transmits the same (this is referred to as power ramping), thereby increasing the probability of receiving the random access preamble by the base station.

In the third operation 703, the UE transmits uplink information (scheduled transmission, or message 3) including a UE identifier thereof (this may be referred to as a UE contention resolution identity) (or a valid UE identifier if the UE already has the valid UE identifier (C-RNTI) in the cell before starting the random access procedure) to the base station through the uplink data channel (physical uplink shared channel (PUSCH)) using the uplink resource allocated in the second operation 702. The transmission timing of the uplink data channel for transmitting message 3 follows the uplink transmission timing control command received from the base station in the second operation 702. In addition, the transmission power of the uplink data channel for transmitting the message 3 is determined in consideration of the power ramping value of the random access preamble and the power control command received from the base station in the second operation 702. The uplink data channel for transmitting the message 3 is the first uplink data signal transmitted by the UE to the base station after the UE transmits the random access preamble.

Finally, in a fourth operation 704, in case that the base station determines that the UE has performed random access without collision with other UEs, a message (contention resolution message (CR message) or message 4) including the identifier of the UE having transmitted the uplink data in the third operation 703 is transmitted to the corresponding UE.

In this regard, in case that a plurality of UEs receive the same TC-RNTI in the second operation 702, each of the plurality of UEs that have received the same TC-RNTI transmits message 3 with a UE contention resolution identity thereof to the base station in the third operation 703, and the base station transmits message 4 (CR message) including UE contention resolution identity among the plurality of the UE contention resolution identities for contention resolution. In case that the UE receives message 4 (CR message) including a UE identifier thereof from the base station in the fourth operation 704 (or in case that the UE transmits message 3 including a UE identifier (C-RNTI) in the third operation 703 and receives a UE-specific control information including a CRC based on the UE identifier (C-RNTI) thereof through PDCCH in the fourth operation 704), the UE determines that random access has been completed successfully. Accordingly, the UE which has confirmed that the UE identifier thereof is included in the message 4 (CR message), among a plurality of UEs that have received the same TC-RNTI from the base station, may determine that random access has been completed successfully. In addition, the UE transmits HARQ-ACK/NACK indicating whether the message 4 has been successfully received to the base station through a physical uplink control channel (PUCCH).

In case that the base station fails to receive the data signal from the UE due to collision between the data transmitted by the UE in the third operation 703 and the data of another UE, the base station no longer transmits data to the UE. Accordingly, in case that the UE fails to receive the data transmitted from the base station in the fourth operation 704 for a predetermined period of time, the UE determines that the random access procedure has failed and starts again from the first operation 701.

As described above, the UE may transmit random access preamble through a PRACH in the first operation 701 of the random access procedure. Each cell has 64 available preamble sequences, and 4 long preamble formats and 9 short preamble formats may be used according to a transmission type. The UE generates 64 preamble sequences using a root sequence index and a cyclic shift value signaled as system information, and randomly selects one sequence to use the sequence as a preamble.

The base station may inform the UE of control information (or configuration information) indicating time-frequency resources to be usable for PRACH by using at least one of SIB, higher layer signaling (radio resource control (RRC) information), or downlink control information (DCI). The frequency resource for PRACH transmission indicates the start RB point of transmission to the UE, and the number of RBs to be used is determined according to the preamble format transmitted through the PRACH and the applied subcarrier spacing. As shown in Table 4 below, the time resource for PRACH transmission may inform preconfigured PRACH configuring cycle, a subframe index and a start symbol including a PRACH transmission time point (a PRACH occasion which may be interchangeable with a transmission time point), the number of PRACH transmission time points in a slot, etc. through a PRACH configuration index (0 to 255). Through the PRACH configuration index, the random access configuration information included in the SIB, and the index of the SSB selected by the UE, the UE may confirm the time and frequency resources through which the random access preamble is transmitted, and transmit the selected sequence as a preamble to the base station.

search is a cell supporting the LTE-MTC service or not, and in case that the cell also supports the LTE-MTC service, a resource location capable of receiving the corresponding system information block may be acquired. In addition, a UE supported by the existing LTE service may be supported by the LTE service without adding an additional operation or a new operation to the existing operation.

TABLE 4

| PRACH Configuration Index | Preamble format | $n_{SFN} \bmod x = y$ | | Subframe number | Starting symbol | Number of PRACH slots within a subframe | $N_t^{RA,slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 1 | 0 | — | — | 0 |
| 1 | 0 | 16 | 1 | 4 | 0 | — | — | 0 |
| 2 | 0 | 16 | 1 | 7 | 0 | — | — | 0 |
| 3 | 0 | 16 | 1 | 9 | 0 | — | — | 0 |
| 4 | 0 | 8 | 1 | 1 | 0 | — | — | 0 |
| 5 | 0 | 8 | 1 | 4 | 0 | — | — | 0 |
| 6 | 0 | 8 | 1 | 7 | 0 | — | — | 0 |
| 7 | 0 | 8 | 1 | 9 | 0 | — | — | 0 |
| 8 | 0 | 4 | 1 | 1 | 0 | — | — | 0 |
| 9 | 0 | 4 | 1 | 4 | 0 | — | — | 0 |
| 10 | 0 | 4 | 1 | 7 | 0 | — | — | 0 |
| ... | | | | ... | | | | |
| 104 | A1 | 1 | 0 | 1, 4, 7 | 0 | 2 | 6 | 2 |
| ... | | | | ... | | | | |
| 251 | C2 | 1 | 0 | 2, 7 | 0 | 2 | 2 | 6 |
| 252 | C2 | 1 | 0 | 1, 4, 7 | 0 | 2 | 2 | 6 |
| 253 | C2 | 1 | 0 | 0, 2, 4, 6, 8 | 0 | 2 | 2 | 6 |
| 254 | C2 | 1 | 0 | 0, 1, 2, 3, 4, 5, 6, 7, 8, 9 | 0 | 2 | 2 | 6 |
| 255 | C2 | 1 | 0 | 1, 3, 5, 7, 9 | 0 | 2 | 2 | 6 |

In the LTE communication system, LTE-MTC (machine-type communication) technology has been developed to support application services such as the Internet of Things (IoT). The LTE-MTC is an IoT-only access technology that considers key requirements such as low-power design, low-cost equipment supply, low construction cost, stable coverage, and large-scale terminal access implementation. In the LTE-MTC technology, a long battery life of a terminal may be guaranteed based on a low-power design by reducing the transmission speed and transmission bandwidth compared to the LTE service and introducing a power saving mode. In addition, since the transmission speed and transmission bandwidth are greatly reduced, the complexity of the communication modem is greatly reduced, thereby implementing a low-cost terminal. In addition, in the LTE-MTC, a single antenna technology may be applied instead of a multiple antenna (MIMO) technology, thereby minimizing power consumption. In addition, since the existing LTE network may be used as it is, the existing LTE service and LTE-MTC service may be supported simultaneously without additional investment.

In addition, in order not to have any effect on a UE supported by the existing LTE service, the base station may include additional information in the remaining bits of the MIB included in the PBCH for the existing LTE service to indicate that the cell that transmitted the PBCH also supports the LTE-MTC service, and may further indicate indirectly a resource location in which a system information block (system information block type 1-bandwidth reduced (SIB1-BR) for the LTE-MTC service is transmitted. Through this, the terminal or nodes supported by the LTE-MTC service may determine whether the cell found through the cell search is a cell supporting the LTE-MTC service or not, and A UE supporting the LTE-MTC service (hereinafter referred to as an MTC UE) may perform a random access procedure, based on the received various system information. Additionally, in the first operation 701 of the random access procedure described in FIG. 7, the MTC UE a CE level (coverage enhancement level, CE-level) before transmits a random access preamble (hereinafter, may be used interchangeably with a physical random access channel (PRACH), a PRACH preamble, and a preamble) to the base station. As in the description of the LTE-MTC service, in order to increase coverage, the MTC terminal may transmit the random access preamble repeatedly such that UEs at the cell edge may also succeed in random access. However, since the UEs in the cell center do not need to repeatedly transmit a random access preamble, multiple CE levels may be configured and the number of repetitions, frequency resources, frequency resources, and permeable sequence resources, which are related to random access preamble applied to each MTC UEs, may be differently configured according to the respective CE levels.

Meanwhile, to reduce the complexity of a reduced-capability UE according to an embodiment of the disclosure, a half-duplex operation (or half-duplex communication) for operating without a duplexer in a frequency division duplex (FDD) or time division duplex (TDD) system may be considered. Accordingly, there is a need for a communication method by which a reduced-capability UE performs a half-duplex operation in an FDD or TDD system. In addition, the reduced-capability UE requires random access with a minimized delay time when performing a half-duplex operation.

The disclosure proposes a method by which a cell or a base station recognizes a reduced capability (RedCap) UE during an initial access process of the reduced-capability UE (or half-duplex communication UE) as follows.

The reduced-capability UE (or base station) may acquire cell synchronization by receiving a synchronization signal block in the initial cell access for accessing a cell (or a base station) as shown in the embodiments of FIG. 4 or 5 and then determine whether the cell supports a reduced-capability UE through MIB acquisition or SIB acquisition or a random access process. In case that the cell is determined to support a reduced-capability UE, the reduced-capability UE may transmit capability information including at least one of a bandwidth size supported in the cell by the reduced-capability UE, whether half-duplex communication is supported, and the number of transmitting or receiving antennas being performed (or supported) to the base station to enable the base station to know that the UE attempting to access is a reduced-capability UE. Thereafter, the reduced-capability UE may complete the random access process to proceed to the RRC connection mode for performing transmission and reception of data with the cell.

The reduced-capability UE may support half-duplex communication or may support full-duplex communication. Therefore, the reduced-capability UE may report to the base station through a capability report whether the half-duplex communication or full-duplex communication is supported, and after the report, the reduced-capability UE may also be configured by the base station whether the reduced-capability UE transmits and receives using half-duplex communication or transmits and receives using full-duplex communication. In case that the UE reports the capability for the half-duplex communication to the base station, since a duplexer generally does not exist, a switching gap for changing RF between transmission and reception may be required in a case of operation in FDD or TDD.

Accordingly, in case that the reduced-capability UE is configured or scheduled for simultaneous occurrence of uplink transmission (hereinafter, uplink may be used interchangeably with "uplink") and downlink reception (hereinafter, downlink may be used interchangeably with "downlink"), a situation in which the switching gap is required and an operation of the reduced-capability UE will be described with reference to FIGS. 8A, 8B, 9A, 9B, 10A, and 10B.

The FDD and TDD frame structures of the 5G system in FIGS. 8A, 8B, 9A, 9B, 10A, and 10B may refer to the NR standard including TS 38.211.

<Resolution of Simultaneous Occurrence of Downlink Reception Scheduled by Physical Signal and Uplink Transmission Configured by a Higher Layer Signal>

Figure 8A:
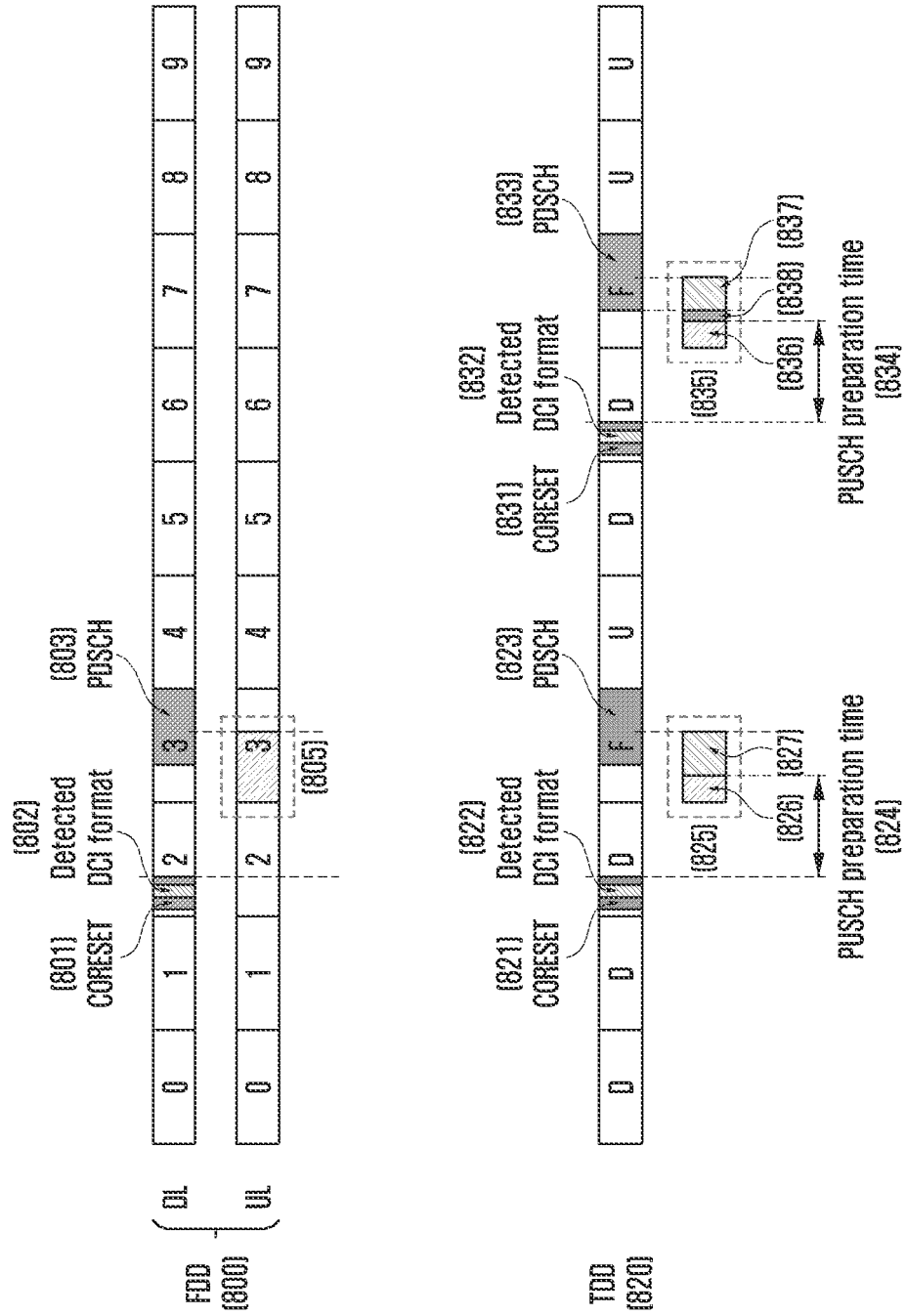
FIG. 8A illustrates a first embodiment of a case in which simultaneous downlink reception and uplink transmission by a reduced-capability UE occur in a wireless communication system according to an embodiment of the disclosure.
Figure 8B:
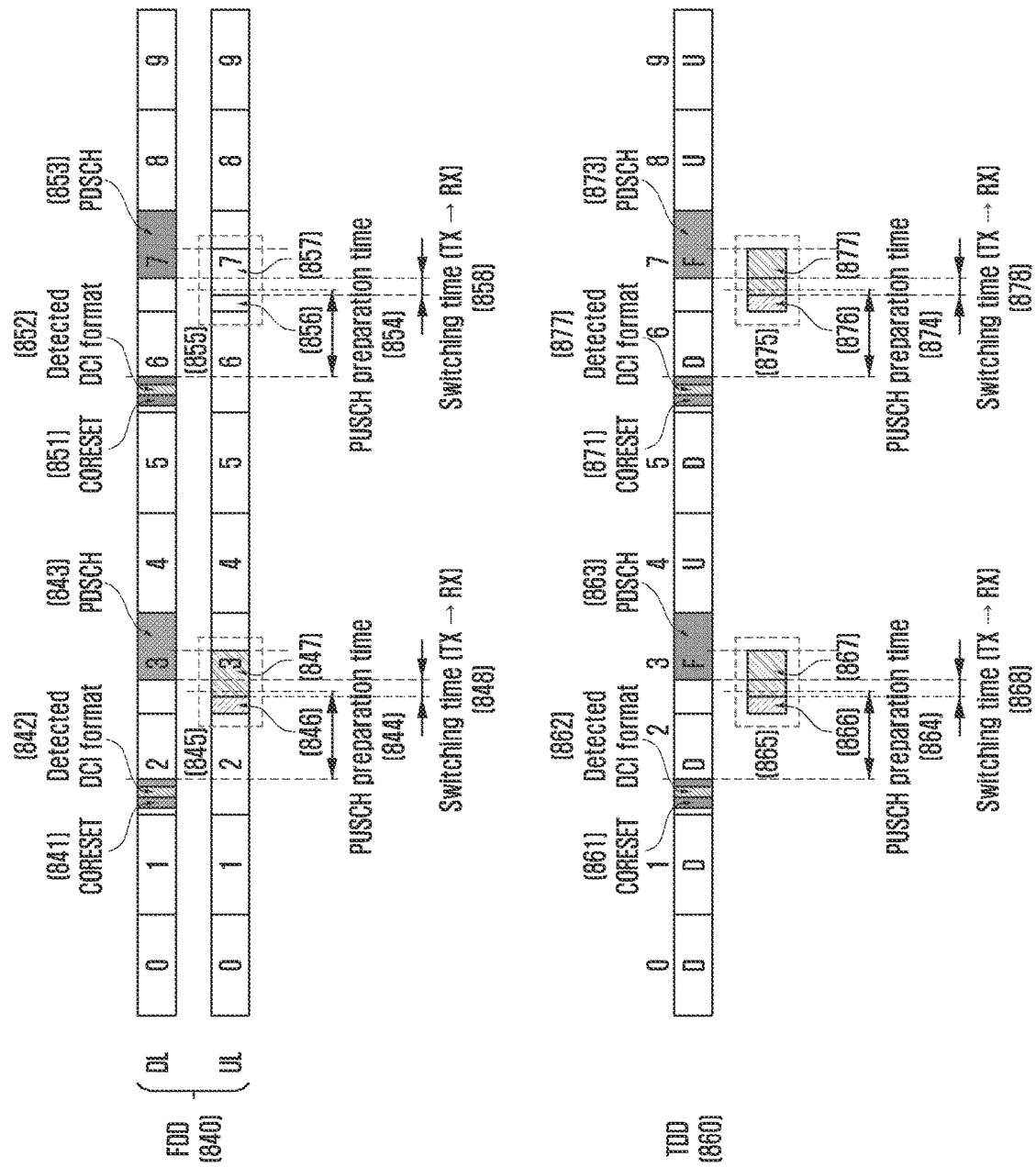
FIG. 8B illustrates a first embodiment of another case in which simultaneous downlink reception and uplink transmission by a reduced-capability UE occur in a wireless communication system according to an embodiment of the disclosure.

FIGS. 8A and 8B illustrate a first embodiment of a case in which simultaneous downlink reception and uplink transmission by a reduced-capability UE occur in a wireless communication system according to various embodiments of the disclosure.

FIGS. 8A and 8B illustrate a situation in which reception of a downlink data channel (e.g., PDSCH) by a downlink control channel (e.g., PDCCH) and transmission of an uplink data/control channel or uplink signal, to be transmitted at a specific resource (frequency, time, etc.), previously configured by a higher layer signal occur simultaneously in a specific time interval. The transmission of uplink data, uplink control channel, or uplink signal may include, for example, configured grant uplink data transmission, HARQ-ACK, CSI, or/and SR transmission on PUCCH, SRS transmission, and the like.

Referring to FIG. 8A, only a situation in which downlink data scheduled by a downlink control channel and configured uplink data, a control channel or/and an uplink signal (hereinafter referred to as uplink data/control channel/uplink signal) collide in a specific time interval is mainly considered, but application to reception of a downlink signal such as CSI-RS instead of downlink data may also be possible, and application to uplink transmission such as a random access channel instead of the uplink data/control channel/uplink signal may also be possible.

FDD 800 of FIG. 8A is on the assumption that the reduced-capability UE reports a capability signal indicating support of full-duplex communication or is configured by the base station to perform transmission/reception through full-duplex communication.

In the FDD 800 of FIG. 8A, the reduced-capability UE may decode a DCI format 802 for scheduling a downlink data channel 803 in the CORESET 801 and may determine that the downlink data channel 803 is received at a specific resource such as a specific frequency (or specific RBs) and a specific time (or a specific slot, symbols). In addition, the reduced-capability UE may be configured such that an uplink data/control channel or uplink signal 805 is to be transmitted at a specific resource by a preconfigured higher layer signal. At this time, the reduced-capability UE may determine that the time interval in which the downlink data channel 803 is received overlaps with the time interval in which the transmission of the uplink data/control channel or uplink signal 805 is previously configured by a higher layer signal.

In case that the reduced-capability UE reports a capability signal indicating support of full-duplex communication or is configured by the base station to perform transmission/reception through full-duplex communication even if the time interval in which the downlink data channel 803 is received overlaps with the time interval in which the transmission of the uplink data/control channel or uplink signal 805 is previously configured by a higher layer signal, the reduced-capability UE may simultaneously perform the reception of the downlink data channel 803 and the transmission of the uplink data/control channel or uplink signal 805.

Next, TDD 820 of FIG. 8A is on the assumption that the reduced-capability UE reports a capability signal indicating support of full-duplex communication or is configured by the base station to perform transmission/reception through full-duplex communication. The TDD 820 of FIG. 8A shows two different situations in which the reception of a downlink data channel by a downlink control channel and the transmission of an uplink data/control channel or uplink signal, to be transmitted at a specific resource (frequency, time, etc.), previously configured by a higher layer signal occur simultaneously in a specific time interval.

First, in the TDD 820 of FIG. 8A, the reduced-capability UE may decode the DCI format 822 for scheduling the downlink data channel 823 in the CORESET 821 and may determine that the downlink data channel 823 is received at a specific resource such as a specific frequency (or specific RBs) and a specific time (or a specific slot, symbols). In addition, the reduced-capability UE may be configured such that the uplink data/control channel or uplink signal 825 is to be transmitted at a specific resource by a preconfigured higher layer signal.

At this time, the reduced-capability UE does not expect the transmission of the uplink data/uplink control channel from symbols within a PUSCH preparation time 824 from the last symbol of the CORESET 821 that has received a DCI format 822 to be cancelled. That is, the reduced-capability UE may transmit the uplink data/uplink control channel (826). Uplink transmission in the remaining symbols other than the transmitted symbol among the uplink data/uplink control channels configured to be transmitted may be canceled (827). In the case of uplink data/control channel transmission, when transmission from specific symbols is canceled, for example, if DMRS transmission is canceled, uplink transmission in the remaining symbols may be canceled because of the difficulty in receiving the received uplink data/control channel by the base station.

The PUSCH preparation time is given as a constant value after the last symbol of the CORESET 821, and the constant value $T=(N2+d\_21+d\_2)*(2048+144)*k*2^{(-u)}*T\_c, d\_22)$. N2 is a value related to the processing capability of a UE and is a constant determined based on the subcarrier spacing (u) of the PDCCH or PUSCH. d_21 is a constant determined based on whether the 1st symbol of the PUSCH consists of only DMRS. d_22 is a constant determined based on whether the DCI format indicates the switch of the BWP. d_2 is a value reported from the UE for a PUSCH having a larger priority in case that the PUCCH and the PUSCH have different priorities. k=64, T_c is $1/(480*10^3*4096)$ as the basic time unit of NR.

Second, in the TDD 820 of FIG. 8A, the reduced-capability UE may decode the DCI format 832 for scheduling the downlink data channel 833 in the CORESET 831 and may determine that the downlink data channel 833 is received at a specific resource such as at a specific frequency (or specific RBs) and a specific time (or a specific slot, symbols). In addition, the reduced-capability UE may be configured such that the uplink SRS 825 is to be transmitted at a specific resource by a preconfigured higher layer signal.

At this time, the reduced-capability UE does not expect the transmission of the uplink SRS 835 from symbols within the PUSCH preparation time 834 from the last symbol of the CORESET 831 that has received the DCI format 832 to be cancelled. That is, the reduced-capability UE may transmit the uplink SRS (836). Transmission of symbols corresponding to the portion 837 overlapping in time with the downlink data among the uplink SRSs configured to be transmitted may be canceled. Uplink SRS in symbols corresponding to the remaining portion 838 that does not overlap in time with the downlink data may be transmitted. Due to the symbol-by-symbol-based transmission of SRS, transmission from specific symbols may be performed even if transmission from the specific symbols is canceled because of the benefit obtained in case that the transmission is performed.

Referring to FIG. 8B, FDD 840 is on the assumption that the reduced-capability UE reports a capability signal indicating support of half-duplex communication or is configured by the base station to perform transmission/reception through half-duplex communication regardless of the report of the capability signal indicating support of half-duplex communication (or non-support of half-duplex communication). The FDD 840 of FIG. 8B shows two different situations in which the reception of a downlink data channel by a downlink control channel and the transmission of an uplink data/control channel or uplink signal, to be transmitted at a specific resource (frequency, time, etc.), previously configured by a higher layer signal occur simultaneously in a specific time interval.

First, in the FDD 840 of FIG. 8B, the reduced-capability UE may decode the DCI format 842 for scheduling the downlink data channel 843 in the CORESET 841 and may determine that the downlink data channel 843 is received at a specific resource such as a specific frequency (or specific RBs) and a specific time (or a specific slot, symbols). In addition, the reduced-capability UE may be configured such that an uplink data/control channel or uplink signal 845 is to be transmitted at a specific resource by a preconfigured higher layer signal.

At this time, the reduced-capability UE does not expect the transmission of the uplink data/uplink control channel from the symbols within the PUSCH preparation time 844 from the last symbol of the CORESET 841 that has received the DCI format 842 to be cancelled. That is, the reduced-capability UE may transmit the uplink data/uplink control channel (846).

A time for switching RF from transmission to reception based on the 1st symbol of the downlink data channel 843 needs to be considered additionally to receive downlink data from the 1st symbol of the downlink data channel 843. The time required for switching the RF may be configured through a higher layer signal to the reduced-capability UE or may be defined in the standard. Therefore, even if the symbols are within the PUSCH preparation time 844 from the last symbol of the CORESET 841 that has received the DCI format 842, the reduced-capability UE cancels the transmission of the uplink data/uplink control channel from the symbols within the RF switching time 848 backward from the 1st symbol of the downlink data channel 843, and does not expect the transmission of the uplink data/uplink control channel from the remaining symbols in the symbols within the PUSCH preparation time 844 from the last symbol of the CORESET 841 to be cancelled. That is, the uplink data/uplink control channel may be transmitted (846). Transmission of the remaining symbols except for the transmitted symbol 846 among the uplink data/uplink control channels configured to be transmitted may be canceled (847).

Second, in the FDD 840 of FIG. 8B, the reduced-capability UE may decode the DCI format 852 for scheduling the downlink data channel 853 in the CORESET 851 and may determine that the downlink data channel 853 is received at a specific resource such as a specific frequency (or specific RBs) and a specific time (or a specific slot, symbols). In addition, the reduced-capability UE may be configured such that the uplink SRS 855 is to be transmitted at a specific resource by a preconfigured higher layer signal.

At this time, the reduced-capability UE does not expect the transmission of the uplink SRS from symbols within the PUSCH preparation time 854 from the last symbol of the CORESET 851 that has received the DCI format 852 to be cancelled. That is, the reduced-capability UE may transmit the uplink SRS (856).

A time for switching RF from transmission to reception based on the 1st symbol of the downlink data channel 853 needs to be additionally considered to receive downlink data from the 1st symbol of the downlink data channel 853. Therefore, even if the symbols are within the PUSCH preparation time 854 from the last symbol of the CORESET 851 that has received the DCI format 852, the reduced-capability UE cancels the transmission of the uplink SRS from the symbols within the RF switching time 858 backward from the 1st symbol of the downlink data channel 853, and does not expect the transmission of the uplink SRS from the remaining symbols in the symbols within the PUSCH preparation time 854 from the last symbol of the CORESET 851 to be cancelled. That is, the uplink SRS may be transmitted (856). The reduced-capability UE cancels uplink SRS transmission for symbols corresponding to a portion 857 that overlaps in time with the downlink data. In the symbols corresponding to the remaining portions that do not overlap in time with the downlink data, the uplink SRS may be transmitted from the remaining symbols that do not overlap with the RF switching time 858.

Next, TDD 860 of FIG. 8B is on the assumption that the reduced-capability UE reports a capability signal indicating support of half-duplex communication or is configured by the base station to perform transmission/reception through half-duplex communication regardless of the report of the capability signal indicating support of full-duplex communication (or non-support of half-duplex communication). The TDD 860 of FIG. 8B shows two different situations in which the reception of a downlink data channel by a downlink control channel and the transmission of an uplink data/control channel or uplink signal, to be transmitted at a specific resource (frequency, time, etc.), previously configured by a higher layer signal occur simultaneously in a specific time interval.

First, in the TDD 860 of FIG. 8B, the reduced-capability UE may decode the DCI format 862 for scheduling the downlink data channel 863 in the CORESET 861 and may determine that the downlink data channel 863 is received at a specific resource such as a specific frequency (or specific RBs) and a specific time (or a specific slot, symbols). In addition, the reduced-capability UE may be configured such that the uplink data/control channel or uplink signal 865 is to be transmitted at a specific resource by a preconfigured higher layer signal.

At this time, the reduced-capability UE does not expect the transmission of uplink data/uplink control channel from symbols within the PUSCH preparation time 864 from the last symbol of the CORESET 861 that has received the DCI format 862 to be cancelled. That is, the reduced-capability UE may transmit the uplink data/uplink control channel (866). A time for switching RF from transmission to reception based on the 1st symbol of the downlink data channel 863 needs to be considered additionally to receive downlink data from the 1st symbol of the downlink data channel 863. Therefore, even if the symbols are within the PUSCH preparation time 864 from the last symbol of the CORESET 861 that has received the DCI format 862, the reduced-capability UE cancels the transmission of the uplink data/ uplink control channel in the symbols within the RF switching time 868 forward from the 1st symbol of the downlink data channel 863, and does not expect the transmission of the uplink data/uplink control channel from the remaining symbols in the symbols within the PUSCH preparation time 864 from the last symbol of the CORESET 861 to be cancelled. That is, the reduced-capability UE may transmit the uplink data/uplink control channel (866). The reduced-capability UE may cancel the uplink transmission in the remaining symbols except for the transmitted symbol 866 among the uplink data/uplink control channels configured to be transmitted (867).

Second, in the TDD 860 of FIG. 8B, the reduced-capability UE may decode the DCI format 872 for scheduling the downlink data channel 873 in the CORESET 871 and may determine that the downlink data channel 873 is received at a specific resource such as a specific frequency (or specific RBs) and a specific time (or a specific slot, symbols). In addition, the reduced-capability UE may be configured such that the uplink SRS 875 is to be transmitted at a specific resource by a preconfigured higher layer signal.

At this time, the reduced-capability UE does not expect the transmission of the uplink SRS from symbols within the PUSCH preparation time 874 from the last symbol of the CORESET 871 that has received the DCI format 872 to be cancelled. That is, the reduced-capability UE may transmit the uplink SRS (876). A time for switching RF from transmission to reception based on the 1st symbol of the downlink data channel 873 needs to be additionally considered to receive downlink data from the 1st symbol of the downlink data channel 873. Therefore, even if the symbols are within the PUSCH preparation time 874 from the last symbol of the CORESET 871 that has received the DCI format 872, the reduced-capability UE cancels the transmission of the uplink SRS from the symbols within the RF switching time 878 forward from the 1st symbol of the downlink data channel 873, and does not expect the transmission of the uplink SRS from the remaining symbols in the symbols within the PUSCH preparation time 874 from the last symbol of the CORESET 871 to be cancelled. That is, the reduced-capability UE may transmit the uplink SRS (876). Uplink SRS transmission for symbols corresponding to a portion 877 that overlaps in time with the downlink data is cancelled. In the symbols corresponding to the remaining portions that do not overlap in time with the downlink data, the uplink SRS may be transmitted from the remaining symbols that do not overlap with the RF switching time 878.

As described in FIGS. 8A and 8B, even if the time interval in which the downlink data channel is received overlaps with the time interval in which the transmission of the uplink data/control channel or uplink signal is previously configured by the higher layer signal, the reduced-capability UE may perform the reception of a downlink data channel and transmission of an uplink data/control channel or uplink signal by using the methods provided in FIGS. 8A and 8B.

In addition, in case that a time interval in which the downlink data channel is received overlaps with a time interval in which the transmission of the uplink data/control channel or uplink signal is previously configured by the higher layer signal, the base station and the UE utilize the methods provided in FIGS. 8A and 8B. In the case of no overlap, the UE determines the overlap within the RF switching time defined or configured in the standard for a reduced-capability UE, and in a case of overlap, the UE may not transmit all or part of the uplink data/control channel or uplink signal, the UE may not receive all or part of the downlink data channel, or the UE may expect the base station to perform scheduling for the case.

<Resolution of Simultaneous Occurrence of Synchronization Signal Block Reception and Uplink Transmission Scheduled as a Downlink Control Channel or Configured as a Higher Layer Signal>

Figure 9A:
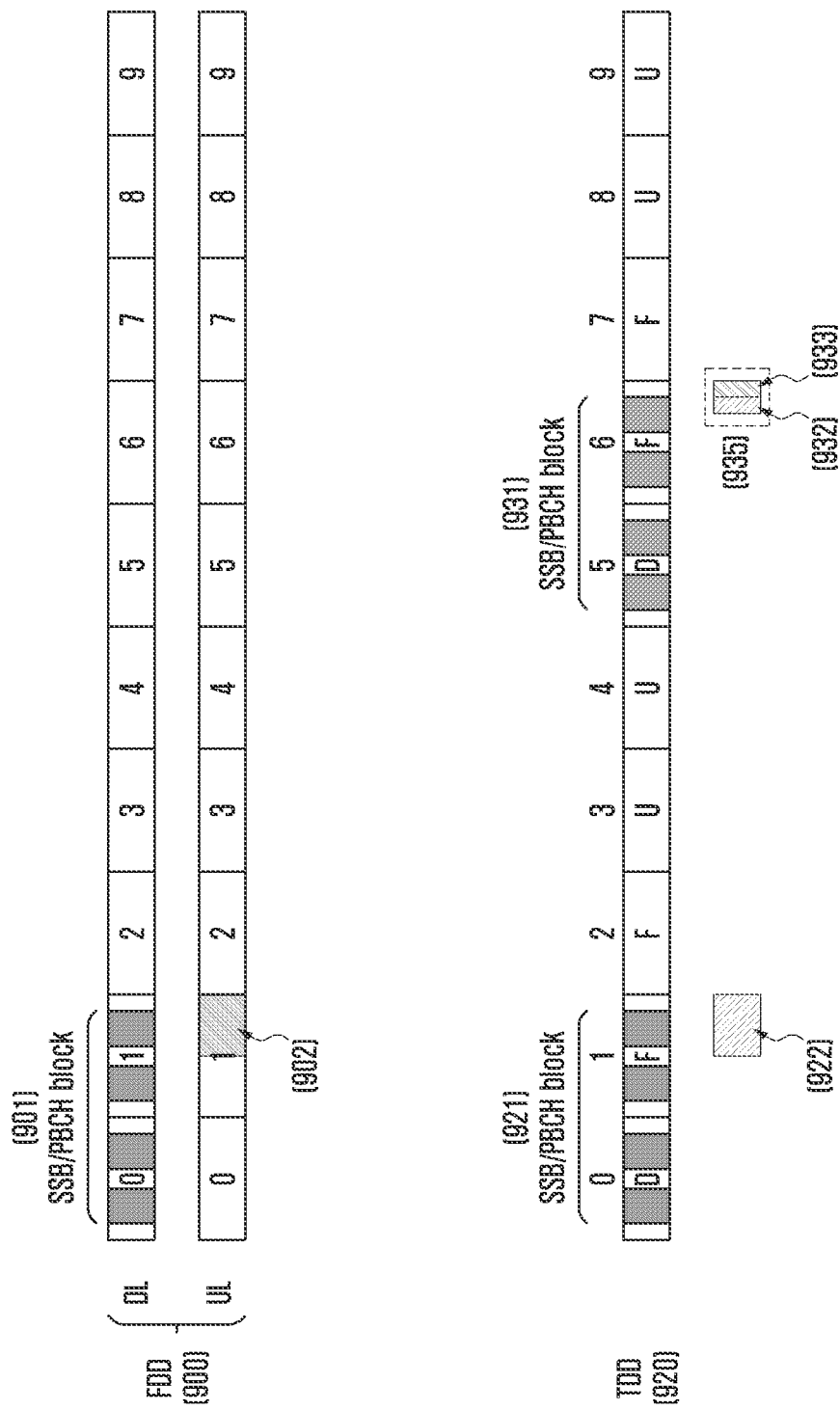
FIG. 9A illustrates a second embodiment of a case in which simultaneous downlink reception and uplink transmission by a reduced-capability UE occur in a wireless communication system according to an embodiment of the disclosure.
Figure 9B:
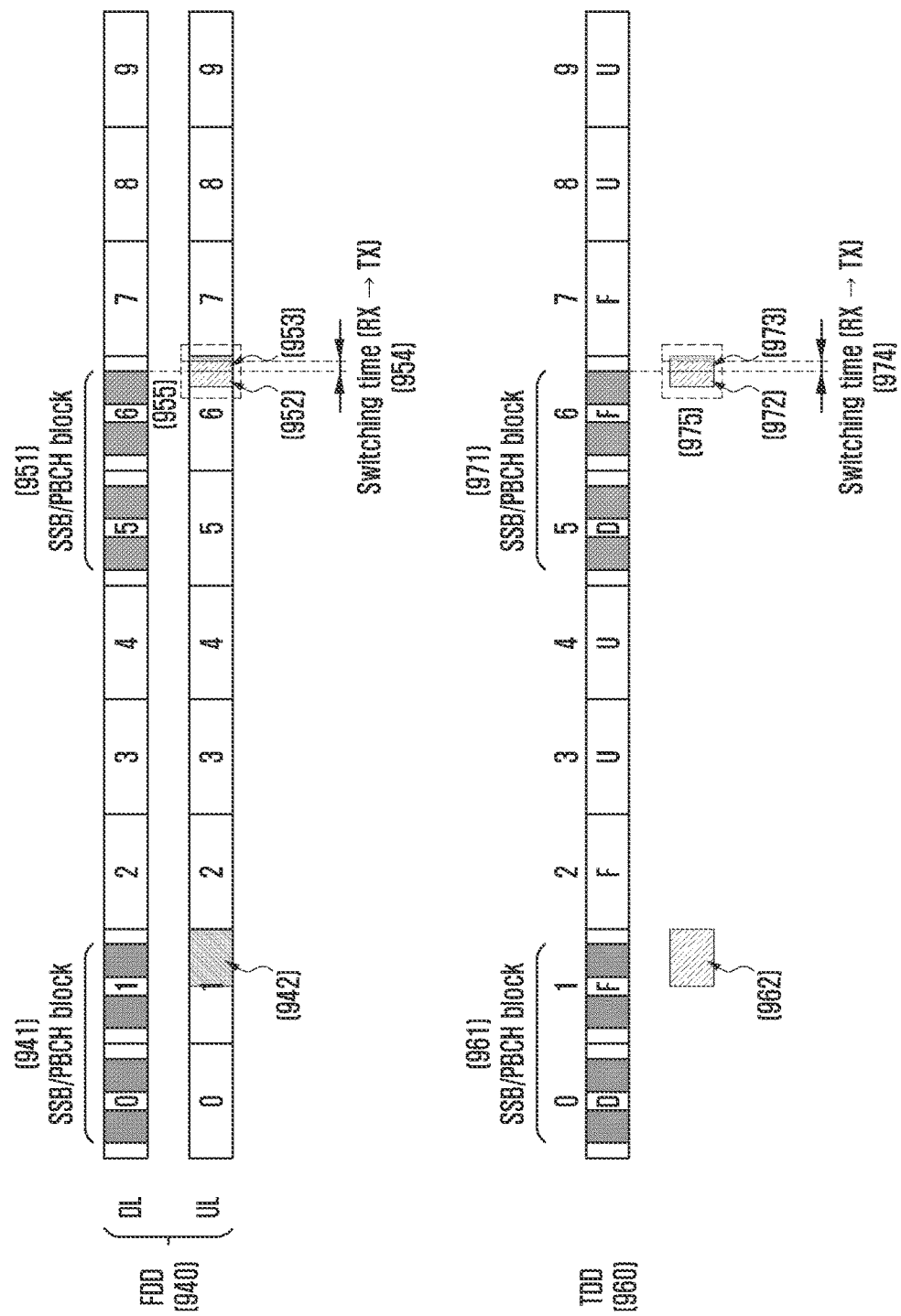
FIG. 9B illustrates a second embodiment of another case in which simultaneous downlink reception and uplink transmission by a reduced-capability UE occur in a wireless communication system according to an embodiment of the disclosure.

FIGS. 9A and 9B illustrate a second embodiment of a case in which simultaneous downlink reception and uplink transmission by a reduced-capability UE occur in a wireless communication system according to various embodiments of the disclosure.

FIGS. 9A and 9B shows a situation in which the reception of a synchronization signal block defined in the standard or configured by a higher layer signal and the transmission of an uplink data/control channel or uplink signal, to be transmitted at a specific resource (frequency, time, etc.), which is scheduled by a downlink control channel (e.g., PDCCH) or is previously configured by a higher layer signal occur simultaneously in the specific time interval. The transmission of the uplink data, uplink control channel, or uplink signal includes, for example, type 2 configured grant uplink data transmission triggered by PDCCH, uplink data transmission and/or UCI transmission scheduled or triggered by DCI, HARQ-ACK, CSI, or/and SR transmission on PUCCH, SRS transmission, and the like.

Referring to FIGS. 9A and 9B, only the uplink data/ control channel/uplink signal that collides with the synchronization signal block in a specific time period is mainly considered, but application to uplink transmission such as a random access channel instead of the uplink data/control channel/uplink signal may also be possible.

FDD 900 of FIG. 9A is on the assumption that the reduced-capability UE reports a capability signal indicating support of full-duplex communication or is configured by the base station to perform transmission and reception through full-duplex communication.

In the FDD 900 of FIG. 9A, the reduced-capability UE may decode the synchronization signal block 901 according to time and frequency resources defined in the standard or configured by a higher layer signal and may determine that the synchronization signal block 901 is received at a specific resource, such as a specific frequency (or a specific RB) and a specific time (or a specific slot, symbols). In addition, the reduced-capability UE may be indicated such that an uplink data/control channel or uplink signal 902 is to be transmitted at a specific resource by a preconfigured higher layer signal or by a downlink control channel. The reduced-capability UE may determine that the time interval in which the synchronization signal block 901 is received overlaps with the time interval in which the transmission of the uplink data/control channel or uplink signal 902 is indicated. In case that the reduced-capability UE reports a capability signal indicating support of full-duplex communication or is configured by the base station to perform transmission and reception through full-duplex communication even if the time interval in which the synchronization signal block 901 is received overlaps with the time interval in which the transmission of the uplink data/control channel or uplink signal 902, the reduced-capability UE may simultaneously perform the reception of the synchronization signal block 901 and the transmission of the uplink data/control channel or uplink signal 902.

Next, TDD 920 of FIG. 9A is on the assumption that the reduced-capability UE reports a capability signal indication support of full-duplex communication or is configured by the base station to perform transmission and reception through full-duplex communication, and the TDD 920 of FIG. 9A shows two different situations in which the reception of a synchronization signal block defined in the standard or configured by a higher layer signal and the transmission of uplink data/control channel or uplink signal, to be transmitted at a specific resource (frequency, time, etc.), which is scheduled by a downlink control channel or is previously configured by the higher layer signal occur simultaneously in a specific time interval.

First, in the TDD 920 of FIG. 9A, the reduced-capability UE may decode a synchronization signal block 921 according to time and frequency resources defined in the standard or configured by a higher layer signal and may determine that the synchronization signal block 921 is received at a specific resource such as a specific frequency (or specific RBs) and a specific time (or a specific slot, symbols). In addition, the reduced-capability UE may be indicated such that the uplink data/control channel 922 is to be transmitted at a specific resource by a preconfigured higher layer signal or by a downlink control channel. The reduced-capability UE may determine that at least one symbol within a slot overlaps with the time interval in which the synchronization signal block 921 is received and with the time interval in which transmission of the uplink data/control channel or uplink signal 922 is indicated. The reduced-capability UE may not transmit the uplink data/uplink control channel 922 from the slot.

Second, in the TDD 920 of FIG. 9A, the reduced-capability UE may decode the synchronization signal block 931 according to time and frequency resources defined in the standard or configured by a higher layer signal and may determine that the synchronization signal block 931 is received at a specific resource such as a specific frequency (or a specific RB) and a specific time (or a specific slot, symbols). In addition, the reduced-capability UE may be configured such that the uplink SRS 935 is to be transmitted at a specific resource by a preconfigured higher layer signal or by a downlink control channel.

The reduced-capability UE may not transmit the uplink SRS 932 in symbols of slots to which the synchronization signal block 931 is received. Uplink SRS transmission may be conducted in the remaining symbols 933 that do not overlap in time with the synchronization signal block 931.

Next, FDD 940 of FIG. 9B is on the assumption that the reduced-capability UE reports a capability signal indicating support of half-duplex communication or is configured by the base station to perform transmission and reception through half-duplex communication regardless of the report of the capability signal indicating support of full-duplex communication (or non-support of half-duplex communication). The FDD 940 of FIG. 9B shows two different situations the reception of a synchronization signal block defined in the standard or configured by a higher layer signal and the transmission of uplink data/control channel or uplink signal, to be transmitted at a specific resource (frequency, time, etc.), which is scheduled by a downlink control channel or is previously configured by a higher layer signal occur simultaneously in a specific time interval.

First, in the FDD 940 of FIG. 9B, the reduced-capability UE may decode the synchronization signal block 941 according to time and frequency resources defined in the standard or configured by a higher layer signal and may determine that the synchronization signal block 941 is received at a specific resource such as a specific frequency (or specific RBs) and a specific time (or a specific slot, symbols). In addition, the reduced capability UE may be indicated such that the uplink data/control channel 942 is to be transmitted at a specific resource by a preconfigured higher layer signal or by a downlink control channel. At this time, the reduced-capability UE may determine that at least one symbol within a slot overlaps with the time interval in which the synchronization signal block 941 is received and with the time interval in which transmission of the uplink data/control channel or uplink signal 942 is indicated. The reduced-capability UE may not transmit the uplink data/uplink control channel 942 from the slot.

Second, in the FDD 940 of FIG. 9B, the reduced-capability UE may decode the synchronization signal block 951 according to time and frequency resources defined in the standard or configured by a higher layer signal and may determine that the synchronization signal block 951 is received at a specific resource such as a specific frequency (or a specific RB) and a specific time (or a specific slot, symbols). In addition, the reduced-capability UE may be configured such that the uplink SRS 955 is to be transmitted at a specific resource by a preconfigured higher layer signal or by a downlink control channel.

The reduced-capability UE may not transmit the uplink SRS 952 from the symbols of slots to which the synchronization signal block 951 is received. At this time, a time for switching RF from reception to transmission based on the last symbol of the synchronization signal block 951 needs to be considered additionally to transmit the uplink SRS from the remaining symbols 953 that do not overlap in time with the synchronization signal block 951. Therefore, even if the symbols 953 do not overlap in time with the synchronization signal block 951, the reduced-capability UE may not perform the uplink SRS transmission from the symbols within the RF switching time 954 from the last symbol of the synchronization signal block 951 and may transmit the uplink SRS in case that even after the RF switching time 954, symbols indicated to transmit the uplink SRS exist.

Next, TDD 960 of FIG. 9B is on the assumption that the reduced-capability UE reports a capability signal indicating support of half-duplex communication or is configured by the base station to perform transmission and reception through half-duplex communication regardless of the report of the capability signal indicating support of full-duplex communication (or non-support of half-duplex communication). The TDD 960 of FIG. 9B shows two different situations in which the reception of a synchronization signal block defined in the standard or established by higher layer signal and the transmission of uplink data/control channel or uplink signal, to be transmitted at a specific resource (frequency, time, etc.), which is scheduled by a downlink control channel or is previously configured by a higher layer signal occur simultaneously in a specific time interval.

First, in the TDD 960 of FIG. 9B, the reduced-capability UE may decode the synchronization signal block 961 according to time and frequency resources defined in the standard or configured by a higher layer signal and may determine that the synchronization signal block 961 is received at a specific resource such as a specific frequency (or a specific RB) and a specific time (or a specific slot, symbols). In addition, the reduced-capability UE may be indicated to transmit the uplink data/control channel 962 in a specific resource by a preconfigured higher layer signal or by a downlink control channel. At this time, the reduced-capability UE may determine that at least one symbol within a slot overlaps with the time interval in which the synchronization signal block 961 is received and with the time interval in which transmission of the uplink data/control channel or uplink signal 962 is indicated. The reduced-capability UE may not transmit the uplink data/uplink control channel 962 from the slot.

Second, in the TDD 960 of FIG. 9B, the reduced-capability UE may decode the synchronization signal block 971 according to time and frequency resources defined in the standard or configured by a higher layer signal and may determine that the synchronization signal block 971 is received at a specific resource such as a specific frequency (or a specific RB) and a specific time (or a specific slot, symbols). In addition, the reduced-capability UE may be configured such that the uplink SRS 975 is to be transmitted at a specific resource by a preconfigured higher layer signal or by a downlink control channel.

At this time, the reduced-capability UE may not transmit the uplink SRS 972 from symbols of slots to which the synchronization signal block 971 is received. A time for switching RF from reception to transmission based on the last symbol of the synchronization signal block 971 needs to be considered additionally to transmit the uplink SRS from the remaining symbols 973 that do not overlap in time with the synchronization signal block 971. Therefore, even if the symbols 973 do not overlap in time with the synchronization signal block 971, the reduced-capability UE may not perform the uplink SRS transmission from the symbols within the RF switching time 974 from the last symbol of the synchronization signal block and may transmit the uplink SRS in case that even after the RF switching time 954, symbols indicated to transmit the uplink SRS exist.

As described in FIGS. 9A and 9B above, a time interval in which the synchronization signal block is received overlaps with a time interval in which uplink data/control channel or uplink signal indicated by a preconfigured higher layer signal or a downlink control channel is configured to be transmitted, the reduced-capability UE may perform the reception of a synchronization signal block and transmission of an uplink data/control channel or uplink signal by using the methods provided in FIGS. 9A and 9B.

In addition, in case that a time interval in which the synchronization signal block is received overlaps with a time interval in which the uplink data/control channel or uplink signal indicated by preconfigured higher layer signal or by the downlink control channel is configured to be transmitted, the base station and the UE utilize the methods provided in FIGS. 9A and 9B. In the case of no overlap, the UE determines the overlap within the RF switching time defined or configured in the standard for a reduced-capability UE, and in a case of overlap, the UE may not transmit all or part of the uplink data/control channel or uplink signal or the synchronization signal block may not be received according to the implementation of a UE.

<Resolution of the Simultaneous Occurrence of Valid PRACH Occasion and Downlink Reception Scheduled as a Downlink Control Channel or Configured as a Higher Layer Signal>

Figure 10A:
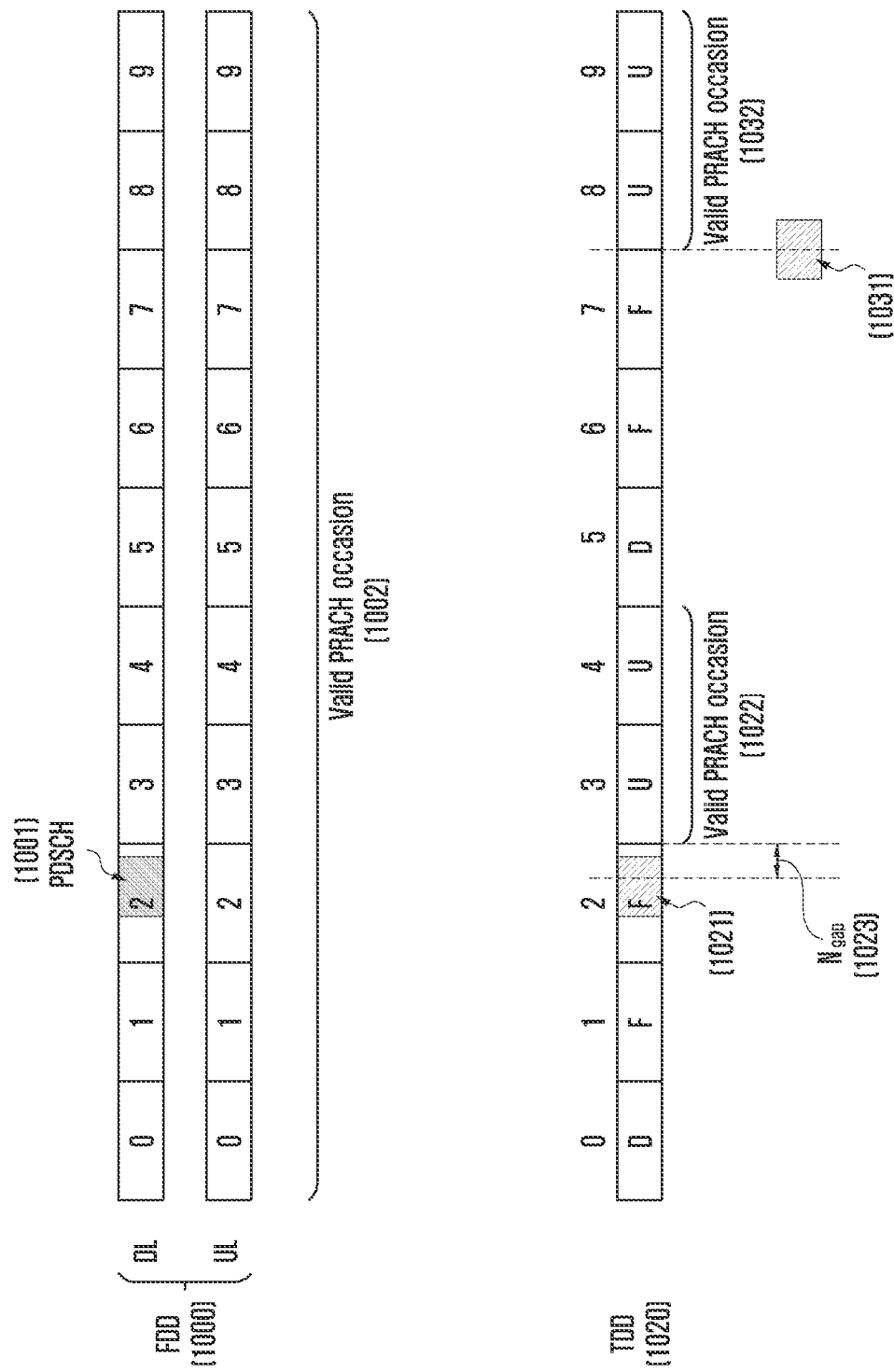
FIG. 10A illustrates a third embodiment of a case in which simultaneous downlink reception and uplink transmission by a reduced-capability UE occur in a wireless communication system according to an embodiment of the disclosure.
Figure 10B:
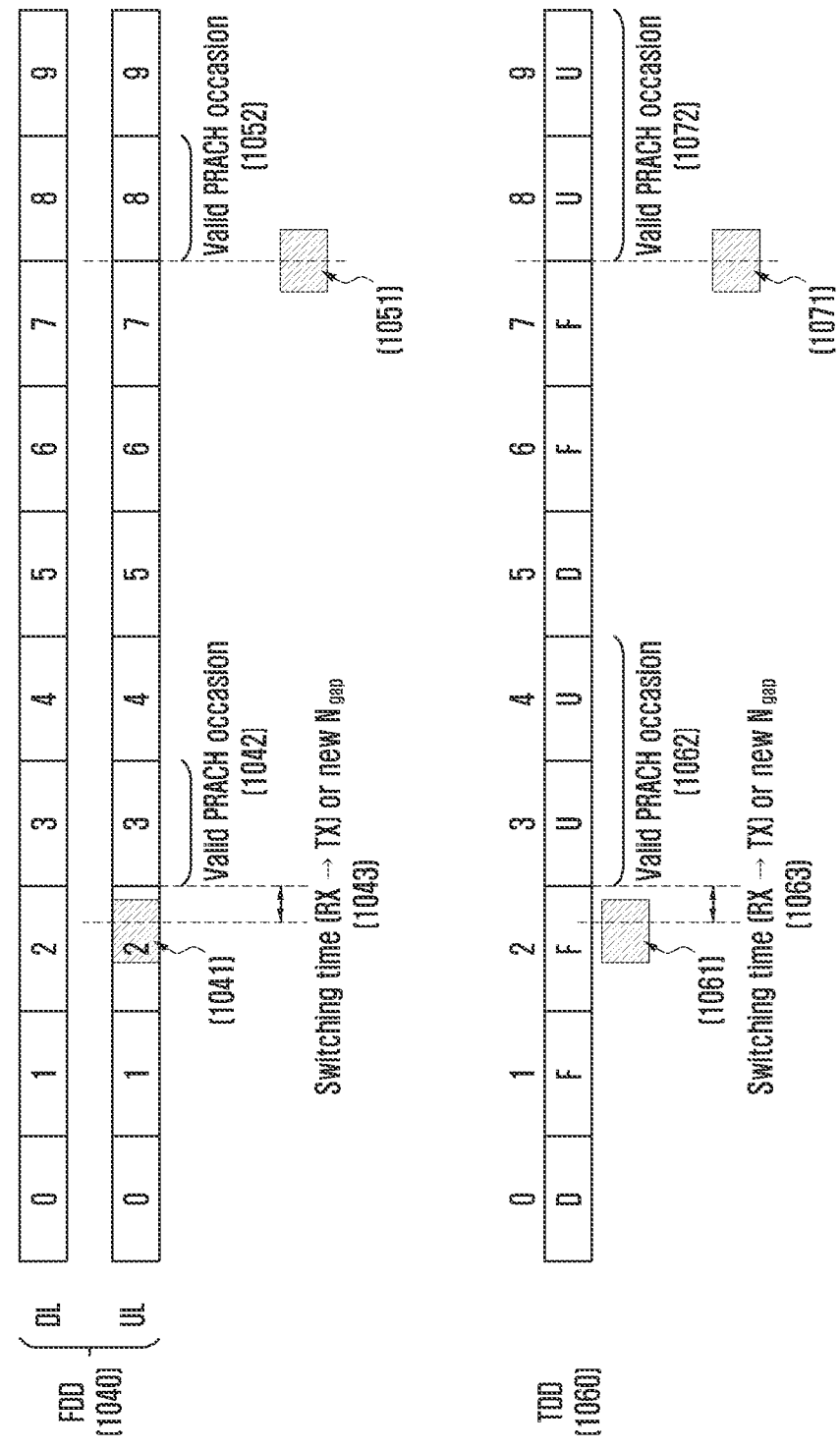
FIG. 10B illustrates a third embodiment of another case in which simultaneous downlink reception and uplink transmission by a reduced-capability UE occur in a wireless communication system according to an embodiment of the disclosure.

FIGS. 10A and 10B illustrate a third embodiment of a case in which simultaneous downlink reception and uplink transmission by a reduced-capability UE occur in a wireless communication system according to various embodiments of the disclosure.

FIGS. 10A and 10B show a situation in which a valid PRACH occasion defined in the standard and downlink data/control channel or RS reception, to be received at a specific resource (frequency, time, etc.), which is scheduled by a downlink control channel or is previously configured by a higher layer signal occur simultaneously in a specific time interval. The downlink data channel or control channel, downlink RS reception may include, for example, PDCCH reception, PDSCH reception, CSI-RS reception, and the like.

Since the UE may transmit a random access preamble in the valid PRACH occasion, in case that the UE performs transmission and reception by half-duplex communication and a time interval of the valid PRACH occasion collides with the downlink reception time interval, an operation for restricting the UE operation of downlink reception may be necessary.

Referring to FIGS. 10A and 10B, mainly shows the downlink data that collides with a valid PRACH occasion and a specific time interval. However, application to downlink reception such as downlink control channel/downlink RS instead of downlink data may also be possible.

FDD 1000 of FIG. 10A is on the assumption that the reduced-capability UE reports a capability signal indicating support of full-duplex communication or is configured by the base station to perform transmission/reception through full-duplex communication. In this case, all slots of the uplink carrier of the FDD 1000 are defined as valid PRACH occasions (1002).

In the FDD 1000 of FIG. 10A, the reduced-capability UE may be indicated to receive downlink data 1001, at a specific resource by a preconfigured higher layer signal or a downlink control channel. The reduced-capability UE may determine that the time interval 1002 of the valid PRACH occasion overlaps with the time interval in which reception of the downlink data 1001 is indicated. In case that the reduced-capability UE reports a capability signal indicating support of full-duplex communication or is configured by the base station to perform transmission and reception through in full-duplex communication even if the time interval 1002 of the valid PRACH occasion overlaps with the time interval in which reception of the downlink data 1001 is indicated, the reduced-capability UE may receive the downlink data 1001 in the time interval 1002 in which the valid PRACH occasion exists.

Next, TDD 1020 of FIG. 10A is on the assumption that the reduced-capability UE reports a capability signal indicating support of full-duplex communication or is configured by the base station to perform transmission and reception through full-duplex communication. At this time, in the TDD 1020, in case that the TDD UL-DL configuration is not received by the UE, uplink symbols after $N_{gap}$ immediately after completion of synchronization signal block transmission are defined as a valid PRACH occasion, and in case that the TDD UL-DL configuration is received by the UE, uplink symbols satisfying both locations after $N_{gap}$ after the last downlink symbol and after $N_{gap}$ immediately after completion of synchronization signal block transmission are defined as a valid PRACH occasion (1022, 1032). The $N_{gap}$ may be considered as the minimum switching interval given such that the UE may perform random access in a valid PRACH occasion. Therefore, in case that a specific downlink reception collides within the $N_{gap}$, the UE may prioritize a valid PRACH occasion instead of the downlink reception. That is, the downlink reception may not be performed. A more detailed example will be described in the following TDD 1020.

The TDD 1020 of FIG. 10A shows two different situations in which a valid PRACH occasion and downlink data reception by a preconfigured higher layer signal or by a downlink control channel occur simultaneously in a specific time interval.

First, in the TDD 1020 of FIG. 10A, the reduced-capability UE may be indicated to receive downlink data 1021 at a specific resource by a preconfigured higher layer signal or by a downlink control channel. At this time, the reduced-capability UE may determine that a time interval 1022 of the valid PRACH occasion overlaps within the $N_{gap}$ 1023 with a time interval within a slot in which reception of the downlink data 1021 is indicated. The reduced-capability UE may not receive the downlink data 1021 from the slot.

Second, in the TDD 1020 of FIG. 10A, the reduced-capability UE may be indicated to receive downlink data 1031 at a specific resource by a preconfigured higher layer signal or by a downlink control channel. At this time, the reduced-capability UE may determine that a time interval 1032 of the valid PRACH occasion overlaps with a time interval within a slot in which reception of the downlink data 1031 is indicated. The reduced-capability UE may not receive the downlink data 1031 from the slot.

That is, in the first and second cases, in case that at least one symbol in a valid PRACH occasion including the inside of the $N_{gap}$ corresponds to a slot overlapping reception of downlink data, the reduced-capability UE may not receive the downlink data from the slot.

Next, FDD 1040 of FIG. 10B is on the assumption that the reduced-capability UE reports a capability signal indicating support of half-duplex communication or is configured by the base station to perform transmission and reception through half-duplex communication regardless of the report of the capability signal indicating support of full-duplex communication (or non-support of half-duplex communication). In this case, for convenience, only one slot is indicated as a valid PRACH occasion in the FDD 1040, but all slots of an uplink carrier in the FDD 1040 may be defined as a valid PRACH occasion.

The FDD 1040 of FIG. 10B shows two different situations in which a valid PRACH occasion and reception of downlink data by a preconfigured higher layer signal or by a downlink control channel occur simultaneously in a specific time interval.

First, in the FDD 1040 of FIG. 10B, the reduced-capability UE may be indicated to receive downlink data 1041 at a specific resource by a preconfigured higher layer signal or by a downlink control channel. At this time, the reduced-capability UE may determine that a time interval 1042 of the valid PRACH occasion overlaps within the $N_{gap}$ or RF switching interval 1043 with a time interval in a slot in which reception of the downlink data 1041 is indicated. The reduced-capability UE may not receive or expect to receive the downlink data 1041 from the slot. Alternatively, only for symbols in which the downlink reception indicated time interval overlaps with the $N_{gap}$ or RF switching interval, the downlink data 1041 may not be received or reception thereof may not be expected.

For further explanation of the $N_{gap}$ or RF switching interval 1043 above, even if the time interval 1042 of the valid PRACH occasion overlaps with the time interval in which the reception of the downlink data 1041 is indicated, an $N_{gap}$ or RF switching interval 1043 for FDD may be defined such that the reduced-capability UE may perform transmission and reception through half-duplex communication even in the FDD 1040. In case that the $N_{gap}$ is defined, the $N_{gap}$ 1023 defined in the TDD 1020 may also be used in the FDD 1040 as the minimum interval for switching the RF, or another value may be defined separately. Alternatively, a switching interval necessary for the reduced-capability UE may also be explicitly defined by defining the RF switching interval.

Second, in the FDD 1040 of FIG. 10B, the reduced-capability UE may be indicated to receive downlink data 1051 at a specific resource by a preconfigured higher layer signal or by a downlink control channel. At this time, the reduced-capability UE may determine that the time interval 1052 of the valid PRACH occasion overlaps with the time interval within a slot in which the downlink data 1051 reception is indicated. The reduced-capability UE may not receive or expect to receive the downlink data 1051 from the slot. Alternatively, only for symbols in which the downlink reception indicated time interval overlaps with the $N_{gap}$ or RF switching interval, the downlink data 1051 may not be received or reception thereof may not be expected.

That is, in the first and second cases, in case that at least one symbol in a valid PRACH occasion including the inside of the $N_{gap}$ or RF switching interval 1043 corresponds to a slot overlapping reception of downlink data, the reduced-capability UE may not receive or expect to receive the downlink data from the slot. Alternatively, for only symbols in which the downlink reception indicated time interval overlaps with the $N_{gap}$ or RF switching interval, the downlink data may not be received or the reception thereof may not be expected.

All UEs (non-reduced-capability UEs or reduced-capability UEs) in the FDD 1040 cell may receive a higher layer signal (or system information) indicating that all slots of an uplink carrier are PRACH occasions. At this time, since all PRACH occasions of the uplink carrier in the FDD 1040 are defined to be valid, the non-reduced-capability UE supporting half-duplex communication may not receive the downlink data in all uplink slots according to the embodiment of the operation of the reduced-capability UE. The following methods are proposed to solve such a problem.

First, even in the case of the FDD 1040 cell, only specific uplink slots are indicated to be usable for uplink transmission for the reduced-capability UE. Therefore, even if a higher layer signal (or system information) indicating that all slots are PRACH occasions is received to the reduced-capability UE, the reduced-capability UE may determine that the downlink data may be received in the uplink slot except for uplink slots that may be used for uplink transmission among the PRACH occasions. Information on the position of an uplink slot and/or an uplink symbol (hereinafter referred to as uplink slot/uplink symbol) capable of uplink transmission for the reduced-capability UE may be transmitted from a higher layer signal (or system information) by the base station and received by the reduced-capability UE. The information on the position of the uplink slot/uplink symbol may indicate the location of the uplink slot and/or the uplink symbol located within a period based on a certain period and, for example, may be in a form similar to the current UL/DL configuration information.

Second, a PRACH occasion for the reduced-capability UE is separately indicated. The base station may separately transmit a higher layer signal (or system information) indicating the PRACH occasion (or PRACH configuration index) to the reduced-capability UE. That is, in case that the PRACH occasion is configured, the base station may separately configure a higher layer signal (or system information) transmitted to a non-reduced-capability UE and a higher layer signal (or system information) transmitted to the reduced-capability UE to indicate that only specific slots of higher layer carrier are a PRACH occasion. The reduced-capability UE may determine that that the same may receive downlink data from the remaining uplink slots, except for specific uplink slots which correspond to the PRACH occasion.

Third, a criterion for determining the validity of a PRACH occasion for the reduced-capability UE is newly defined. For example, in case that a non-reduced-capability UE or a reduced-capability UE receives a higher layer signal (or system information) indicating all slots of an uplink carrier are PRACH occasions in the FDD 1040, the non-reduced capability UK may determine that the PRACH occasions are all valid whereas the reduced-capability UE may determine that symbols or slots intended to actually transmit a PRACH preamble or to intended to transmit the PRACH preamble are valid PRACH occasions. Alternatively, the base station may indicate information indicating the validity of the PRACH occasion, for example, information (i.e., information on the location of slots/symbols) indicating the location of the valid occasion to the reduced-capability UE as a higher layer signal (or system information). Alternatively, the base station may indicate a ratio for a valid occasion among the PRACH occasions by a higher layer signal (or system information), and the exact location of the occasion may be defined in the standard. For example, in case that the ratio is indicated as half (½), a PRACH occasion located in an even-numbered slot among possible PRACH occasions may be defined to be valid. In the remaining uplink slots except for the valid PRACH occasion, the reduced-capability UE may determine to be able to receive downlink data.

Fourth, all UEs (non-reduced-capability UEs or reduced-capability UEs) may receive a higher layer signal (or system information) indicating that only specific slots of an uplink carrier are PRACH occasions. The reduced-capability UE may not expect that all slots are configured as PRACH occasions. Accordingly, the base station may schedule downlink transmission of the reduced-capability UE in downlink slots corresponding to the remaining uplink slots except for the specific slots to perform the downlink transmission. On the other hand, the reduced-capability UE may have an issue in which PRACH preamble transmission is restricted in the remaining uplink slots except for the specific slots, and in this case, performance degradation may occur in the uplink transmission of the reduced-capability UE.

Fifth, all UEs (non-reduced-capability UE or reduced-capability UE) may receive a higher layer signal (or system information) indicating that all slots of an uplink carrier are PRACH occasions, in each slot, the base station solves the downlink scheduling by the implementation of the base station implementation, and downlink reception and PRACH preamble transmission of a reduced-capability UE are solved by implementation of the reduced-capability UE. That is, even though all PRACH occasions are defined to be valid in FDD, the base station may transmit a downlink to a reduced-capability UE by scheduling, and the reduced-capability UE may entrust the implementation of the reduced-capability UE whether to receive the downlink or to perform PRACH preamble transmission on a PRACH occasion. Performance degradation of the downlink reception may occur because the downlink reception of the base station may or may not be received by the reduced-capability UE.

Next, TDD 1020 of FIG. 10A is on the assumption that the reduced-capability UE reports a capability signal indicating support of half-duplex communication or is configured by the base station to perform transmission and reception through half-duplex communication regardless of the report of the capability signal indicating support of full-duplex communication (or non-support of half-duplex communication). At this time, in the TDD 1020, in case that the TDD UL-DL configuration is not received by the UE, uplink symbols after $N_{gap}$ are defined as valid PRACH occasions immediately after completion of the synchronization signal block transmission, and in case that the TDD UL-DL configuration is received by the UE, uplink symbols satisfying both locations after $N_{gap}$ after the last downlink symbol and after $N_{gap}$ immediately after completion of the synchronization signal block transmission are defined as valid PRACH occasions (1062, 1072). Since the $N_{gap}$ may be considered as the minimum switching interval given to perform random access on a PRACH occasion valid for the UE, a separate $N_{gap}$ or RF switching interval 1063 for a reduced-capability UE transmitting and receiving through half-duplex communication may be defined.

Therefore, in case that a specific downlink reception collides within the $N_{gap}$ or RF switching 1063, the UE may prioritize a valid PRACH occasion instead of the downlink reception. That is, the downlink reception may not be performed. A more detailed example will be described in the following TDD 1060.

The TDD 1060 of FIG. 10B shows two different situations in which the valid PRACH occasion and the reception of downlink data by a preconfigured higher layer signal or by a downlink control channel occur simultaneously in a specific time interval.

First, in the TDD 1060 of FIG. 10B, the reduced-capability UE may be indicated to receive downlink data 1061 at a specific resource by a preconfigured higher layer signal or by a downlink control channel. At this time, the reduced-capability UE may determine that the time interval 1062 of the valid PRACH occasion overlaps with the time interval in a slot in which the reception of the downlink data 1061 is indicated within the $N_{gap}$ or RF switching interval 1063. The reduced-capability UE may not receive or expect to receive the downlink data 1061 from the slot. Alternatively, only for symbols in which the downlink reception indicated time interval overlaps with the $N_{gap}$ or RF switching interval, the downlink data 1061 may not be received or reception thereof may not be expected.

Second, in the TDD 1060 of FIG. 10B, the reduced-capability UE may be indicated to receive downlink data 1071 at a specific resource by a preconfigured higher layer signal or by a downlink control channel. At this time, the reduced-capability UE may determine that the time interval 1072 of the valid PRACH occasion overlaps with the time interval within a slot in which the reception of the downlink data 1071 is indicated. The reduced-capability UE may not receive or expect to receive the downlink data 1071 from the slot. Alternatively, only for symbols in which the downlink reception indicated time interval overlaps with the $N_{gap}$ or RF switching interval, the downlink data 1071 may not be received or reception thereof may not be expected.

That is, in the first and second cases, in case that at least one symbol in a valid PRACH occasion including the inside of the $N_{gap}$ or RF switching interval 1063 corresponds to a slot overlapping reception of downlink data, the reduced-capability UE may not receive or expect to receive the downlink data from the slot. Alternatively, only for the overlapping symbols, the downlink data may not be received or reception thereof may not be expected.

Next, a mapping relationship between an index of a synchronization signal block and a valid PRACH occasion will be described with reference to FIG. 11.

First, in the 5G system, the UE may receive a synchronization signal block and receive a control resource set (CORESET) #0 (which may correspond to a control resource set having a control resource set index or identity (ID) of 0) and search space #0 (which may correspond to a search space having a search space index or ID of 0) configured therefrom. The UE may perform monitoring on the control resource set #0, assuming that the selected synchronization signal block and the demodulation reference signal (DMRS) transmitted from the control resource set #0 are Quasi Co Location (QCL). In addition, the UE may receive system information based on the downlink control information transmitted from the control resource set #0.

The UE may obtain PRACH-related configuration information for random access from the received system information. The UE having acquired the PRACH-related configuration information may transmit a preamble to the base station in the PRACH, based on the index of the received synchronization signal block when performing random access (i.e., the terminal may transmit the preamble in the PRACH by using a transmission beam having a QCL relationship with a reception beam when receiving the synchronization signal block having the index), and the base station having received the preamble from the UE through the PRACH may acquire information on the index of the selected (received) synchronization signal block by the terminal. That is, the UE transmits a PRACH preamble for random access on the random access occasion mapped to the index of the received synchronization signal block.

Figure 11:
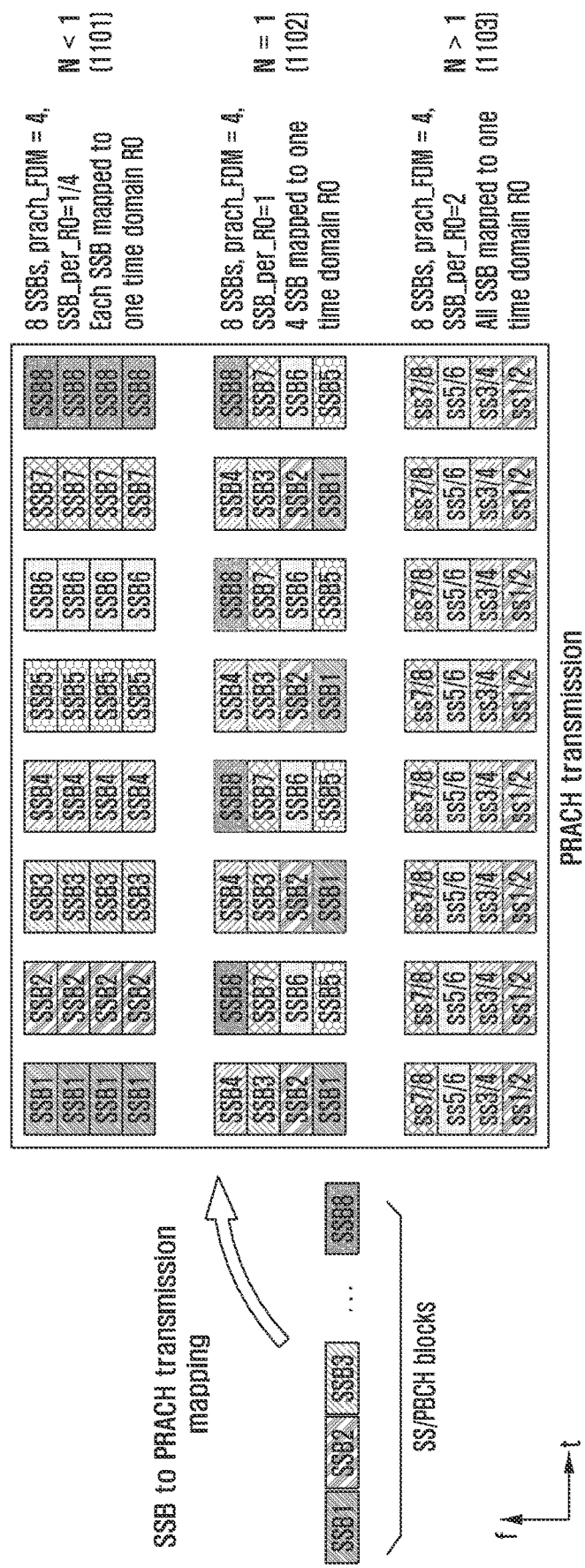
FIG. 11 illustrates a relationship between a synchronization signal block and a valid PRACH occasion in a wireless communication system according to an embodiment of the disclosure.

FIG. 11 illustrates a relationship between a synchronization signal block and a valid PRACH occasion in a wireless communication system according to an embodiment of the disclosure.

Referring to FIG. 11, each SSB #i indicates an index #i of each synchronization signal block described in FIG. 4 or 5.

In FIG. 11, N refers to the number of synchronization signal blocks mapped to one PRACH occasion and indicates that four PRACH occasions are frequency-multiplexed in one time interval (e.g., at least one symbol interval, at least one slot interval, at least one subframe interval, or the like).

As an example, a case where N is less than one (N<1) 1101, shows that four PRACH occasions multiplexed in the frequency domain are mapped to one synchronization signal block. That is, one PRACH occasion is mapped to ¼ synchronization signal block. Next, as an example, a case where N is one (N=1) 1102 shows that four PRACH occasions multiplexed in a frequency domain are mapped to four synchronization signal blocks. That is, in this case, one PRACH occasion may be mapped to one synchronization signal block. Next, as an example, a case where N is greater than one (N>1) 1103 shows that frequency-multiplexed four PRACH occasions are mapped to eight synchronization signal blocks (SSB #1 to SSB #8) (FIGS. 9A and 9B shows an SSB described as an SS). That is, in this case, one PRACH occasion may be mapped to two synchronization signal blocks.

Figure 12:
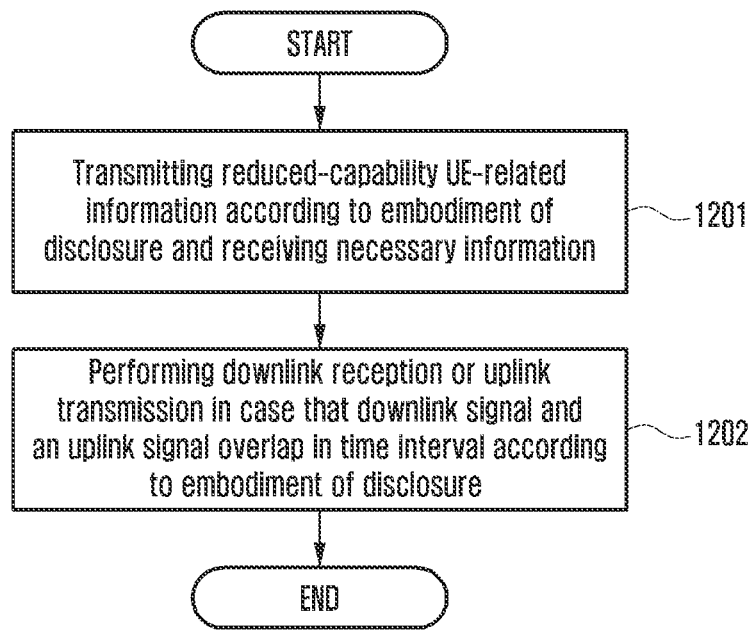
FIG. 12 shows a procedure performed by a reduced-capability UE in a wireless communication system according to an embodiment of the disclosure.

FIG. 12 shows a procedure of a reduced-capability UE in a wireless communication system according to an embodiment of the disclosure.

Referring to FIG. 12, the procedure may be applied to the first, second, and third embodiments described above.

In operation 1201 of FIG. 12, the reduced-capability UE receives, from the base station, at least one of configuration information including resource information for random access in the reduced-capability UE, TDD or FDD cell information, valid PRACH occasion transmission location information, resource information on a configuration-based downlink signal or a configuration-based uplink signal, and full-duplex or half-duplex configuration information. The configuration information may be provided to the UE through SIB or RRC information or DCI. In addition, the reduced-capability UE transmits, to the base station, the reduced-capability UE capability information regarding whether full-duplex communication or half-duplex communication is supported. In operation 1202, in case that uplink signal transmission and downlink signal reception according to the embodiments of the disclosure overlap with each other in a time interval, the reduced-capability UE perform the uplink signal transmission or the downlink signal reception, based on whether the cell is TDD or FDD, whether the reduced-capability UE supports half-duplex communication or full-duplex communication, or/and whether the base station has configured half-duplex or full-duplex.

Each operation of FIG. 12 may be omitted or added and is not necessarily performed in the described order.

Figure 13:
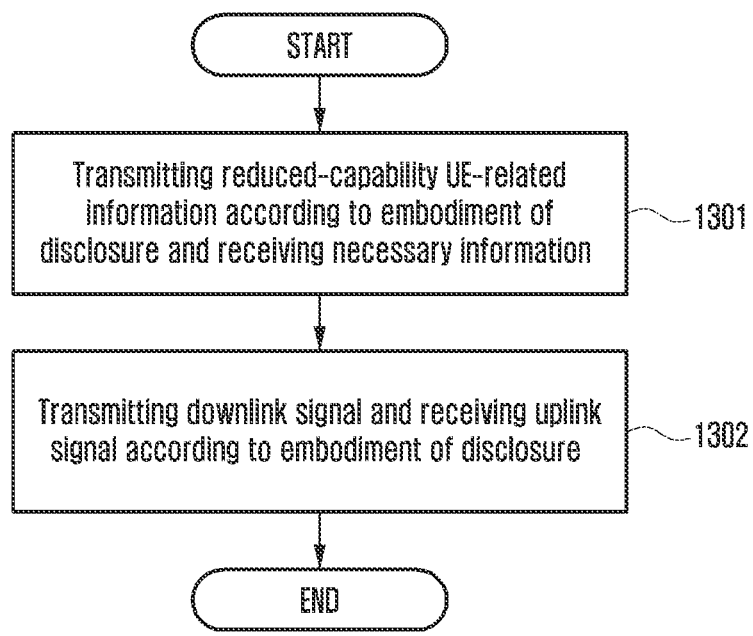
FIG. 13 shows a procedure performed by a base station in a wireless communication system according to an embodiment of the disclosure.

FIG. 13 shows a procedure of a base station in a wireless communication system according to an embodiment of the disclosure.

Referring to FIG. 13, the procedure may be applied to the first, second, and third embodiments described above.

In operation 1301 of FIG. 13, the base station transmits, to the reduced-capability UE, at least one of configuration information including resource information for random access in the reduced-capability UE, TDD or FDD cell information, valid PRACH occasion transmission location information, resource information on a configuration-based downlink signal or a configuration-based uplink signal, and full-duplex or half-duplex configuration information. The configuration information may be provided to the UE through SIB or RRC information or DCI. In operation 1302, the base station may receive an uplink signal and transmit a downlink signal. Alternatively, in case that uplink signal transmission and downlink signal reception according to the embodiments of the disclosure overlap with each other in a time interval, the base station perform uplink signal reception or downlink signal transmission, based on whether the cell is TDD or FDD, whether the reduced-capability UE supports half-duplex communication or full-duplex communication, or/and whether the base station has configured half-duplex or full-duplex.

Each operation of FIG. 13 may be omitted or added and is not necessarily performed in the described order.

Figure 14:
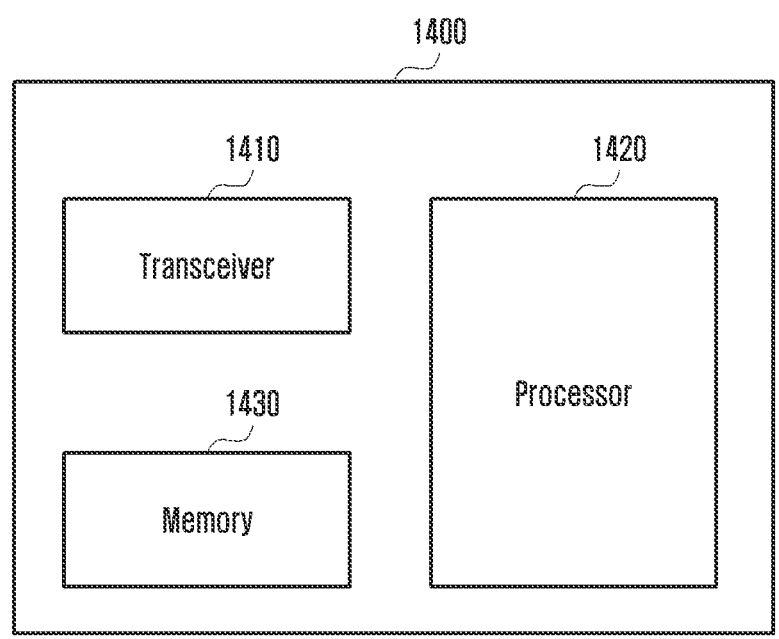
FIG. 14 is a block diagram of a UE according to an embodiment of the disclosure.

FIG. 14 is a block diagram of a reduced-capability UE or a general UE according to an embodiment of the disclosure.

Referring to FIG. 14, a UE 1400 may include a transceiver 1410, a processor 1420, and a memory 1430. As described above with reference to FIGS. 1 to 7, the UE 1400 according to the disclosure may operate according to the method described in the embodiments of FIGS. 8 to 11 in a wireless communication system to which the disclosure is applied. However, according to an embodiment, the elements of the UE 1400 are not limited to the above-described example. According to another embodiment, the UE 1400 may further include an element other than the above-described elements, or may include fewer elements in a case of a reduced-capability UE. In addition, in a specific case, the transceiver 1410, the processor 1420, and the memory 1430 may be implemented in a single chip.

The transceiver 1410 may include a transmitter and a receiver according to another embodiment. The transceiver 1410 may transmit and receive signals to and from the base station. The signal may include control information and data. To this end, the transceiver 1410 may include an RF transmitter that up-converts and amplifies the frequency of a transmitted signal, an RF receiver that low-noise amplifies a received signal and down-converts the frequency thereof, and the like. Further, the transceiver 1410 may receive a signal through a wireless channel, output the signal through the processor 1420, and transmit the signal output from the processor 1420 through a wireless channel.

The processor 1420 may control a series of processes operable by the UE 1400 according to the above-described embodiment of the disclosure.

The memory 1430 may store control information or data such as transmission resource configuration included in a signal obtained from the UE 1400 and may have a region for storing data required for control of the processor 1420, data generated during control by the processor 1420, and the like.

Figure 15:
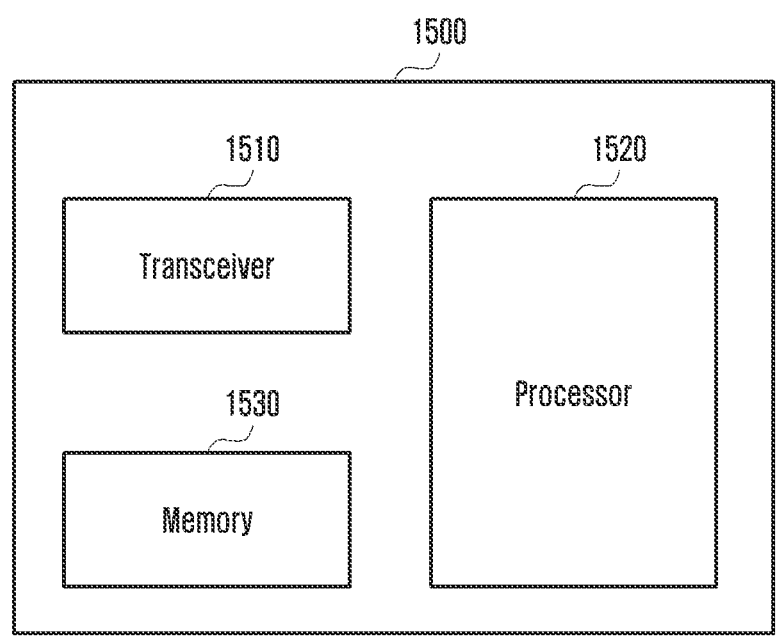
FIG. 15 is a block diagram of a base station according to an embodiment of the disclosure.

FIG. 15 is a block diagram illustrating a configuration of a base station performing an operation according to an embodiment of the disclosure.

Referring to FIG. 15, a base station 1500 may include a transceiver 1510, a processor 1520, and a memory 1530. As described above with reference to FIGS. 1, 2, 3, 4, 5, 6 and 7, the base station 1500 according to the disclosure may operate according to the disclosure may operate according to the method described in the embodiments of FIGS. 8A, 8B, 9A, 9B, 10A, 10B, and 11 in a wireless communication system to which the disclosure is applied. However, according to an embodiment, the elements of the base station 1500 are not limited to the above-described example. According to another embodiment, the base station 1500 may further include an element other than the above-described elements, or may include fewer elements. In addition, in a specific case, the transceiver 1510, the processor 1520, and the memory 1530 may be implemented in a single chip. The transceiver 1510 may include a transmitter and a receiver according to another embodiment. The transceiver 1510 may transmit and receive signals to and from the UE. The signal may include control information and data. To this end, the transceiver 1510 may include an RF transmitter that up-converts and amplifies the frequency of a transmitted signal, and an RF receiver that low-noise amplifies a received signal and down-converts the frequency thereof. Further, the transceiver 1510 may receive a signal through a wireless channel, output the signal through the processor 1520, and transmit the signal output from the processor 1520 through a wireless channel.

The processor 1520 may control a series of processes operable by the base station 1500 according to the above-described embodiment of the disclosure. The memory 1530 may store control information and data such as transmission resource configuration determined by the base station 1500 or control information and data received from the UE and may have a region for storing data required for control of the processor 1520 and data generated during control by the processor 1520.

While the disclosure has been shown and described with reference to various embodiments thereof, it will be understood by those skilled in the art that various changes in form and details may be made therein without departing from the spirit and scope of the of the disclosure as defined by the appended claims and their equivalents.

What is claimed is:

1. A method performed by a terminal corresponding to a half-duplex terminal in a communication system, the method comprising:
   receiving, from a base station, information on a synchronization signal block (SSB) indicating a plurality of symbols for the SSB via higher layer signaling;
   identifying whether a resource of an uplink transmission overlaps with an unavailable time resource associated with the SSB;
   in case that the resource of the uplink transmission overlaps with the unavailable time resource and the uplink transmission corresponds to a physical uplink control channel (PUCCH) transmission or a physical uplink shared channel (PUSCH) transmission, skipping the uplink transmission; and
   in case that the resource of the uplink transmission overlaps with the unavailable time resource and the uplink transmission corresponds to a sounding reference signal (SRS) transmission, skipping the SRS transmission in overlapped symbols in the resource of the uplink transmission and transmitting an SRS in un-overlapped symbols in the resource of the uplink transmission,
   wherein the unavailable time resource corresponds to a switching time after a last symbol of the plurality of symbols for the SSB.

2. The method of claim 1, further comprising:
   in case that the resource of the uplink transmission does not overlap with the unavailable time resource, performing the uplink transmission.

3. The method of claim 1, further comprising:
   transmitting, to the base station, capability information associated with a half duplex operation in a frequency division duplex (FDD).

4. The method of claim 1, further comprising:
   in case that a resource for a physical random access channel (PRACH) transmission overlaps with a resource for a downlink reception, selecting the PRACH transmission or the downlink reception based on an implementation of the terminal,
   wherein the downlink reception includes one of a physical downlink control channel (PDCCH) reception, a physical downlink shared channel (PDSCH) reception or a channel state information reference signal (CSI-RS) reception.

5. A method performed by a base station in a communication system, the method comprising:
identifying that a terminal corresponds to a half-duplex terminal;
transmitting, to the terminal, information on a synchronization signal block (SSB) indicating a plurality of symbols for the SSB via higher layer signaling;
identifying whether a resource of an uplink reception overlaps with an unavailable time resource associated with the SSB;
in case that the resource of the uplink reception overlaps with the unavailable time resource and the uplink reception corresponds to a physical uplink control channel (PUCCH) reception or a physical uplink shared channel (PUSCH) reception, skipping to perform the uplink reception; and
in case that the resource of the uplink reception overlaps with the unavailable time resource and the uplink reception corresponds to a sounding reference signal (SRS) reception, skipping the SRS reception in overlapped symbols in the resource of the uplink reception and receiving an SRS in un-overlapped symbols in the resource of the uplink reception,
wherein the unavailable time resource corresponds to a switching time after a last symbol of the plurality of symbols for the SSB.

6. The method of claim 5, further comprising:
in case that the resource of the uplink reception does not overlap with the unavailable time resource, performing the uplink reception.

7. The method of claim 5, further comprising:
receiving, from the terminal, capability information associated with a half duplex operation in a frequency division duplex (FDD).

8. A terminal corresponding to a half-duplex terminal in a communication system, the terminal comprising:
a transceiver; and
a controller coupled with the transceiver and configured to:
receive, from a base station, information on a synchronization signal block (SSB) indicating a plurality of symbols for the SSB via higher layer signaling,
identify whether a resource of an uplink transmission overlaps with an unavailable time resource associated with the SSB,
in case that the resource of the uplink transmission overlaps with the unavailable time resource and the uplink transmission corresponds to a physical uplink control channel (PUCCH) transmission or a physical uplink shared channel (PUSCH) transmission, skip the uplink transmission, and
in case that the resource of the uplink transmission overlaps with the unavailable time resource and the uplink transmission corresponds to a sounding reference signal (SRS) transmission, skip the SRS transmission in overlapped symbols in the resource of the uplink transmission and transmit an SRS in un-overlapped symbols in the resource of the uplink transmission,
wherein the unavailable time resource corresponds to a switching time after a last symbol of the plurality of symbols for the SSB.

9. The terminal of claim 8, wherein the controller is further configured to, in case that the resource of the uplink transmission does not overlap with the unavailable time resource, perform the uplink transmission.

10. The terminal of claim 8, wherein the controller is further configured to transmit, to the base station, capability information associated with a half duplex operation in a frequency division duplex (FDD).

11. The terminal of claim 8,
wherein the controller is further configured to, in case that a resource for a physical random access channel (PRACH) transmission overlaps with a resource for a downlink reception, select the PRACH transmission or the downlink reception based on an implementation of the terminal, and
wherein the downlink reception includes one of a physical downlink control channel (PDCCH) reception, a physical downlink shared channel (PDSCH) reception or a channel state information reference signal (CSI-RS) reception.

12. A base station in a communication system, the base station comprising:
a transceiver; and
a controller coupled with the transceiver and configured to:
identify that a terminal corresponds to a half-duplex terminal,
transmit, to the terminal, information on a synchronization signal block (SSB) indicating a plurality of symbols for the SSB via higher layer signaling,
identify whether a resource of an uplink reception overlaps with an unavailable time resource associated with the SSB,
in case that the resource of the uplink reception overlaps with the unavailable time resource and the uplink reception corresponds to a physical uplink control channel (PUCCH) reception or a physical uplink shared channel (PUSCH) reception, skip to perform the uplink reception, and
in case that the resource of the uplink reception overlaps with the unavailable time resource and the uplink reception corresponds to a sounding reference signal (SRS) reception, skip the SRS reception in overlapped symbols in the resource of the uplink reception and receive an SRS in un-overlapped symbols in the resource of the uplink reception,
wherein the unavailable time resource corresponds to a switching time after a last symbol of the plurality of symbols for the SSB.

13. The base station of claim 12, wherein the controller is further configured to, in case that the resource of the uplink reception does not overlap with the unavailable time resource, perform the uplink reception.

14. The base station of claim 12, wherein the controller is further configured to receive, from the terminal, capability associated with a half duplex operation in a frequency division duplex (FDD).

15. The method of claim 1, wherein the unavailable time resource further includes the plurality of symbols for the SSB.

16. The method of claim 5, further comprising:
in case that a resource for a physical random access channel (PRACH) reception overlaps with a resource for a downlink transmission, receiving a PRACH or performing the downlink transmission,
wherein the downlink transmission includes one of a physical downlink control channel (PDCCH) transmission, a physical downlink shared channel (PDSCH)

transmission or a channel state information reference signal (CSI-RS) transmission.

17. The method of claim 5, wherein the unavailable time resource further includes the plurality of symbols for the SSB.

18. The terminal of claim 8, wherein the unavailable time resource further includes the plurality of symbols for the SSB.

19. The base station of claim 12,
wherein in case that a resource for a physical random access channel (PRACH) reception overlaps with a resource for a downlink transmission, the controller is further configured to receive a PRACH or performing the downlink transmission, and
wherein the downlink transmission includes one of a physical downlink control channel (PDCCH) transmission, a physical downlink shared channel (PDSCH) transmission or a channel state information reference signal (CSI-RS) transmission.

20. The base station of claim 12, wherein the unavailable time resource further includes the plurality of symbols for the SSB.

* * * * *